(12) United States Patent
Wang et al.

(10) Patent No.: US 12,273,871 B2
(45) Date of Patent: Apr. 8, 2025

(54) SIDELINK RELAY COMMUNICATION METHOD AND APPARATUS, DEVICE AND MEDIUM

(71) Applicant: ZTE CORPORATION, Shenzhen (CN)

(72) Inventors: Mengzhen Wang, Shenzhen (CN); Lin Chen, Shenzhen (CN); Weiqiang Du, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 376 days.

(21) Appl. No.: 17/799,626

(22) PCT Filed: Jan. 13, 2021

(86) PCT No.: PCT/CN2021/071419
§ 371 (c)(1),
(2) Date: Aug. 12, 2022

(87) PCT Pub. No.: WO2021/159906
PCT Pub. Date: Aug. 19, 2021

(65) Prior Publication Data
US 2023/0073469 A1    Mar. 9, 2023

(30) Foreign Application Priority Data

Feb. 13, 2020 (CN) .......................... 202010091525.6

(51) Int. Cl.
*H04W 72/1263* (2023.01)
*H04W 88/04* (2009.01)
*H04W 92/18* (2009.01)

(52) U.S. Cl.
CPC ........ *H04W 72/1263* (2013.01); *H04W 88/04* (2013.01); *H04W 92/18* (2013.01)

(58) Field of Classification Search
CPC .. H04W 72/1263; H04W 88/04; H04W 92/18
See application file for complete search history.

(56) References Cited

U.S. PATENT DOCUMENTS

2014/0169251 A1* 6/2014 Lee .................. H04W 56/0015
370/311
2015/0326302 A1* 11/2015 Stojanovski ........ H04W 12/033
370/315
(Continued)

FOREIGN PATENT DOCUMENTS

CN    106162512 A    11/2016
CN    108307472 A     7/2018
(Continued)

OTHER PUBLICATIONS

Extended European Search Report for EP App. No. 21754116.8 dated Jan. 26, 2024 (8 pages).
(Continued)

*Primary Examiner* — Benjamin H Elliott, IV
*Assistant Examiner* — Nevena Zecevic Sandhu
(74) *Attorney, Agent, or Firm* — Foley & Lardner LLP

(57) ABSTRACT

Provided are a sidelink relay communication method and apparatus, a device, and a medium. The sidelink relay communication method is applied to user equipment (UE)-to-Network relay communication. The method includes the following processes. The relay UE receives a data packet from a source communication device through a first bearer between the source communication device and the relay UE, where the data packet is mapped to the first bearer by the source communication device. The relay UE maps the data packet to a second bearer between the relay UE and a target communication device and transmits the data packet to the target communication device, where either the source communication device comprises a remote UE and the target communication device comprises a base station or the source communication device comprises a base station and the target communication device comprises a remote UE.

17 Claims, 9 Drawing Sheets

(56) References Cited

U.S. PATENT DOCUMENTS

2018/0092017 A1* 3/2018 Freda .................... H04W 36/36
2019/0320362 A1 10/2019 Liu et al.
2022/0369164 A1* 11/2022 Hu ........................ H04W 40/22

FOREIGN PATENT DOCUMENTS

| CN | 108307536 A | 7/2018 |
| CN | 108391285 A | 8/2018 |
| CN | 111901847 A | 11/2020 |
| EP | 3326423 A1 | 5/2018 |
| EP | 3 500 046 A1 | 6/2019 |

OTHER PUBLICATIONS

International Search Report for Application No. PCT/CN2021/071419, dated Apr. 16, 2021, 4 pages including translation.

ZTE, "Discussion on connection establishment and bearer setup", *3GPP TSG-RAN WG2 Meeting #96*, R2-168149, Nov. 18, 2016 (Nov. 18, 2016), Reno, USA, entire document.

Office Action for CA Appl. No. 3,167,947 dated Jul. 26, 2024 (6 pages).

* cited by examiner

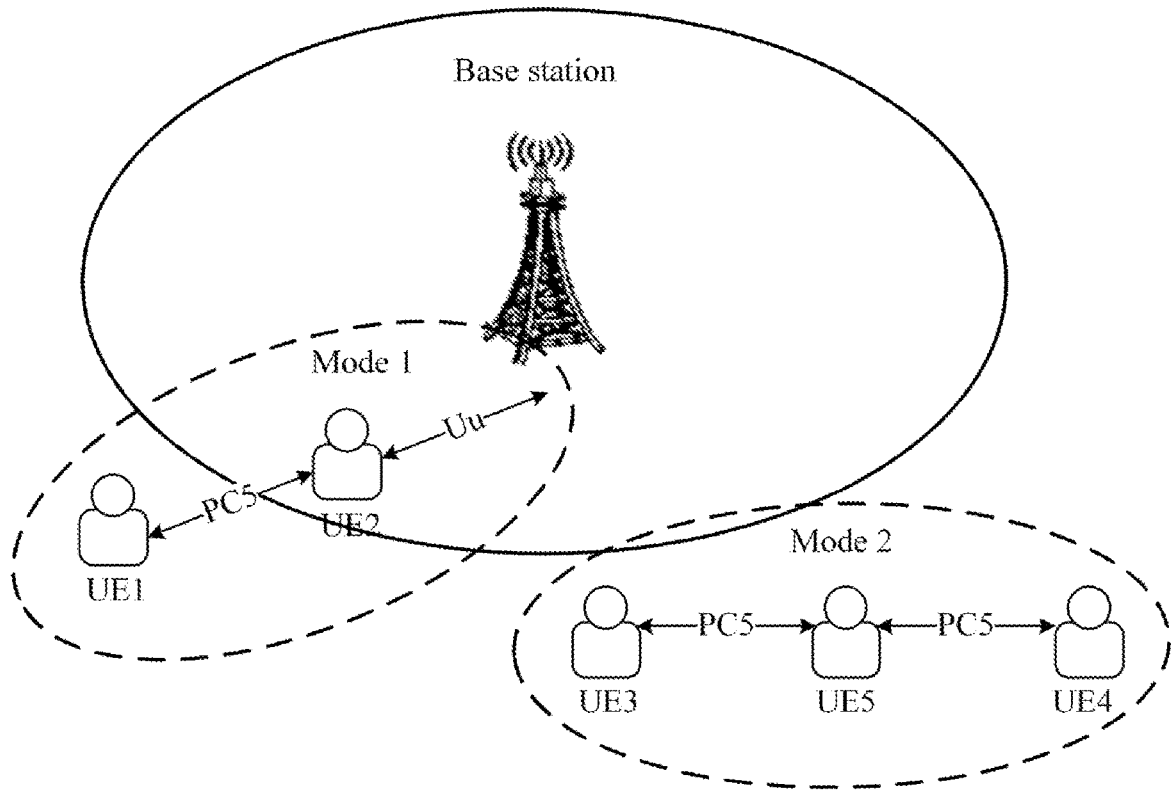

FIG. 1

A relay UE receives a data packet from a source communication device through a first bearer between the source communication device and the relay UE, where the data packet is mapped to a first bearer by the source communication device and the source communication device includes a remote UE or a base station  ⏤S110

The relay UE maps the data packet to a second bearer between the relay UE and a target communication device and transmits the data packet to the target communication device, where the target communication device correspondingly includes a base station or a remote UE  ⏤S120

FIG. 2

SIDELINK RELAY COMMUNICATION METHOD AND APPARATUS, DEVICE AND MEDIUM

CROSS-REFERENCE TO RELATED APPLICATION(S)

This is a national stage application filed under 37 U.S.C. 371 based on International Patent Application No. PCT/CN2021/071419, filed Jan. 13, 2021, which claims priority to Chinese Patent Application No. 202010091525.6 filed with the China National Intellectual Property Administration (CNIPA) on Feb. 13, 2020, the disclosures of which are incorporated herein by reference in their entireties.

TECHNICAL FIELD

The present application relates to the field of communications, for example, a sidelink relay communication method and apparatus, a device, and a medium.

BACKGROUND

With the development of wireless multimedia services, requirements for high data rates and user experience are increasing. Thus, higher demands are placed on the system capacity and coverage of a cellular network. At the same time, application scenarios such as public safety, social network, near-field data sharing, and local advertisement gradually increase the requirement for proximity services (ProSe). To support a wider range of communication applications and services, relay communication based on sidelink (SL) can extend coverage and improve power consumption to apply to indoor relay communication, smart agriculture, smart factories, or public safety. However, due to the big difference, such as, frame structure, quality of service (QoS) processing, and bearer configuration and establishment, between the sidelink communication mechanism of 5G new radio (NR) and the sidelink communication mechanism of 4G long-term evolution (LTE), a sidelink relay scheme based on LTE is not applicable to a 5G NR system. Therefore, how to implement the sidelink relay communication applicable to the 5G NR system is an urgent problem to be solved.

SUMMARY

The present application provides a sidelink relay communication method and apparatus, a device, and a medium which are applicable to a 5G NR system.

An embodiment of the present application provides a sidelink relay communication method applied to user equipment (UE) to network relay communication. The method includes the processes below. A relay UE receives a data packet from a source communication device through a first bearer between the source communication device and the relay UE, where the data packet is mapped to the first bearer by the source communication device. The relay UE maps the data packet to a second bearer between the relay UE and a target communication device and transmits the data packet to the target communication device, where either the source communication device comprises a remote UE and the target communication device comprises a base station or the source communication device comprises a base station and the target communication device comprises a remote UE.

An embodiment of the present application provides a sidelink relay communication method applied to UE-to-Network relay communication. The method includes the processes below. A relay UE indicates relay communication auxiliary information to a base station, receives relay communication configuration information from the base station, and performs data transmission based on the relay communication configuration information.

An embodiment of the present application provides a sidelink relay communication method applied to UE-to-UE relay communication. The method includes the processes below. A relay UE receives a data packet from a source UE through a PC5 radio link control (RLC) bearer between the source UE and the relay UE, where the data packet is mapped by the source UE to the PC5 RLC bearer; and the relay UE parses the data packet, identifies the target UE corresponding to the data packet, maps the data packet to the relay backhaul bearer between the relay UE and the target UE, and sends the data packet to the target UE.

An embodiment of the present application provides a sidelink relay communication method applied to UE-to-UE relay communication. The method includes the processes below. A relay UE acquires first configuration information of relay communication from a base station and performs data forwarding for a source UE and a target UE according to the first configuration information of the relay communication.

An embodiment of the present application provides a sidelink relay communication apparatus configured to a communication device applied to UE-to-Network relay communication. The apparatus includes a first data receiving module and a first data forwarding module.

The first data reception module is configured in the relay UE and to receive a data packet from a source communication device through a first bearer between the source communication device and the relay UE, where the data packet is mapped to the first bearer by the source communication device which comprises a remote UE or a base station.

The first data forwarding module is configured in the relay UE and to map the data packet to a second bearer between the relay UE and a target communication device and transmitting the data packet to the target communication device. Either the source communication device comprises a remote UE and the target communication device comprises a base station or the source communication device comprises a base station and the target communication device comprises a remote UE.

An embodiment of the present application provides a sidelink relay communication apparatus configured to a communication device applied to UE-to-Network relay communication. The apparatus includes a second information indication module and a second data transmission module.

The second information indication module is configured in the relay UE and to indicate relay communication auxiliary information to a base station.

The second data transmission module is configured in the relay UE and to receive relay communication configuration information from the base station and perform data transmission based on the relay communication configuration information.

An embodiment of the present application provides a sidelink relay communication apparatus configured to a communication device applied to UE-to-UE relay communication. The apparatus includes a third data receiving module and a third data forwarding module.

The third data reception module is configured in a relay UE and to receive a data packet from a source UE through a PC5 radio link control (RLC) bearer between the source UE and the relay UE, where the data packet is mapped by the source UE to the PC5 RLC bearer.

The third data forwarding module is configured in the relay UE and to parse the data packet, identify a target UE corresponding to the data packet, map the data packet to a relay backhaul bearer between the relay UE and the target UE, and send the data packet to the target UE.

An embodiment of the present application provides a sidelink relay communication apparatus configured to a communication device applied to UE-to-UE relay communication. The apparatus includes a fourth information acquisition module and a fourth data forwarding module.

The fourth information acquisition module is configured in a relay UE and to acquire first configuration information of relay communication from a base station.

The fourth data forwarding module is configured in the relay UE and to perform data forwarding for a source UE and a target UE according to the first configuration information of the relay communication.

An embodiment of the present application provides a communication device. The communication device includes one or more processors and a storage apparatus configured to store one or more programs. When executed by the one or more processors, the one or more programs cause the one or more processors to implement the preceding sidelink relay communication method applied to UE-to-Network relay communication.

An embodiment of the present application provides a communication device. The communication device includes one or more processors and a storage apparatus configured to store one or more programs. When executed by the one or more processors, the one or more programs cause the one or more processors to implement the preceding sidelink relay communication method applied to UE-to-UE relay communication.

An embodiment of the present application provides a storage medium storing a computer program which, when executed by a processor, implements the sidelink relay communication method according to any embodiment of the present application.

BRIEF DESCRIPTION OF DRAWINGS

FIG. 1 is a diagram of a sidelink relay communication scheme.

FIG. 2 is a flowchart of a sidelink relay communication method according to the present application.

DETAILED DESCRIPTION

Figure 3:
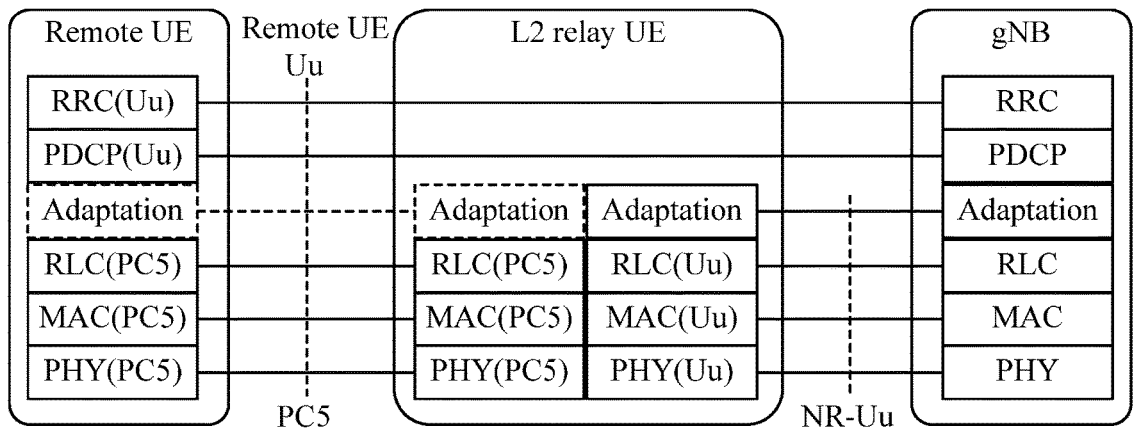
FIG. 3 is a diagram of an L2 UE-to-Network relay control plane protocol stack according to the present application.

Embodiments of the present application are described hereinafter in detail in conjunction with drawings. It is to be noted that if not in collision, embodiments of the present application and features therein may be combined with each other in any manner.

Before embodiments provided by the present application are described, the related knowledge of the sidelink relay communication is first explained exemplarily.

A cellular network centered on base stations has significant limitations in supporting high data rates and proximity services. Under this requirement background, a device-to-device (D2D) communication technology has emerged. The application of the D2D technology may reduce the burden of the cellular network, reduce the battery power consumption of a user equipment, increase a data rate, and improve the robustness of network infrastructure, which satisfies the requirements for high data rate services and proximity services. The D2D technology is also referred to as proximity services (ProSe) or sidelink (SL) communication. The interface between devices is a PC5 interface (sidelink interface). The interface between a device and a base station is a Uu interface (air interface).

To support a wider range of applications and services, relay communication based on sidelink can extend coverage and improve power consumption to apply to indoor relay communication, smart agriculture, smart factories, or public safety. The sidelink relay communication has the following two application scenarios: a UE-to-Network relay and a UE-to-UE relay.

(1) UE-to-Network relay: For UE relay transmission in weak or non-coverage regions, as mode 1 in FIG. 1, UE1 with poor signal quality is allowed to communicate with a network through nearby UE2 with network coverage. This can help operators expand coverage and increase capacity. UE2 is referred to as a UE-to-Network relay, that is, a relay UE. UE1 is referred to as a remote UE.

(2) UE-to-UE relay: In the event of an earthquake or an emergency when a cellular network cannot work normally or to extend a sidelink communication range, devices are allowed to communicate through a relay UE. As mode 2 in FIG. 1, data communication between UE3 and UE4 is performed through UE5 or a multi-hop relay UE. UE5 is referred to as a UE-to-UE relay, that is, a relay UE. UE3 and UE4 are a source UE or a target UE, respectively.

Two UE-to-Network relay solutions are provided in LTE based on an Internet Protocol (IP) layer (layer 3) and an access stratum (layer 2). Layer 3 relay, that is, forwards data according to information such as a target IP address or a port number. For a layer 2 relay, that is, a relay UE performs routing and forwarding of control plane and user plane data at the access stratum so that an operator (that is, a core network network element and a base station) can more efficiently manage a remote UE.

Technical terms included in the present application include but are not limited to radio resource control (RRC), protocol data unit (PDU), radio link control (RLC), backhaul (BH), sidelink (SL), PC5 interface (sidelink interface), Uu interface (air interface), signaling radio bearer (SRB), data radio bearer (DRB), packet data convergence protocol (PDCP), service data adaptation protocol (SDAP), quality of service (QoS), media access control (MAC), user plane function (UPF), 5G QoS identifier (5QI), QoS flow identifier (QFI), guaranteed flow bit rate (GFBR), maximum flow bit rate (MFBR), logical channel ID (LCID), cell radio network temporary identifier (C-RNTI), sidelink bearer, unacknowledged mode (UM), acknowledged mode (AM), access and mobility management function (AMF), radio access network NG application protocol identifier (RAN NGAP ID), aggregate maximum bit rate (AMBR), near-field communication ProSe per-packet priority (PPPP), operations, administration and maintenance (OAM), PC5 QoS flow identifier (PFI), and PC5 5QI (PQI).

In an example embodiment, FIG. 2 is a flowchart of a sidelink relay communication method according to the present application. The method can be applied to the case where control plane data and user plane data in the sidelink relay communication of an NR system are forwarded. The method may be executed by a sidelink relay communication apparatus applied to UE-to-network relay communication according to the present application. The sidelink relay communication apparatus may be implemented by software and/or hardware and integrated in a communication device. The communication device may be a relay UE of layer 2 UE-to-Network relay communication.

As shown in FIG. 2, the sidelink relay communication method provided by the present application is applied to layer 2 UE-to-Network relay communication. The method includes the following steps:

In S110, a relay UE receives a data packet from a source communication device through a first bearer between the source communication device and the relay UE, where the data packet is mapped to the first bearer by the source communication device.

In S120, the relay UE maps the data packet to a second bearer between the relay UE and a target communication device and transmits the data packet to the target communication device.

Either the source communication device comprises a remote UE and the target communication device comprises a base station or the source communication device comprises a base station and the target communication device comprises a remote UE The data packet may be a control plane data packet or a user plane data packet. When the source communication device is a remote UE, the target communication device is a base station. Correspondingly, when the source communication device is a base station, the target communication device is a UE.

For an L2 UE-to-Network relay, the remote UE can maintain the RRC connected state with the base station through the relay UE. That is, the base station can identify the remote UE and save the remote UE context. The network can page the remote UE. The base station or a core network maintains a PDU session for the remote UE. It is equivalent to that the data of the remote UE on an air interface is transmitted to the base station through the PC5 interface SLRB between the remote UE and the relay UE and the relay forwarding bearer between the relay UE and the base station and then transmitted to a 5G core (5GC) network through the PDU session of the remote UE. It is necessary to consider problems such as data routing and bearer mapping in this process.

In the preceding solution, the source communication device maps the data packet to the first bearer between the source communication device and the relay UE and transmits the data packet to the relay UE through the first bearer. After the relay UE receives the data packet, the relay UE maps the data packet to the second bearer between the relay UE and the target communication device and transmits the data packet to the target communication device through the second bearer. Thus, relay data forwarding between the source communication device and the target communication device applicable to a 5G NR system is implemented.

Figure 4:
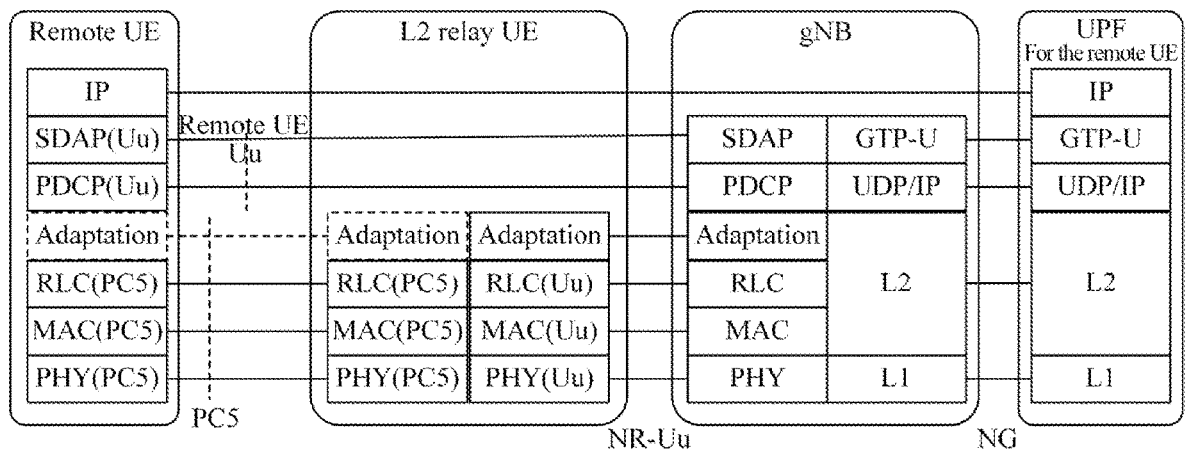
FIG. 4 is a diagram of an L2 UE-to-Network relay user plane protocol stack according to the present application.

An L2 UE-to-Network relay control plane protocol stack is shown in FIG. 3. A user plane protocol stack is shown in FIG. 4. A relay adaptation layer may be introduced for implementing the L2 forwarding and routing function. An adaptation Layer on a PC5 interface (as shown in the dashed box) is optional, meaning that an adaptation Layer is not required to implement the L2 forwarding and routing function in some schemes described below.

In one example, the source communication device is a remote UE, and the target communication device is a base station. That is, the routing of L2 UE-to-Network relay communication data is uplink. The data includes control plane data and user plane data.

Further, that the relay UE receives the data packet, which is mapped by the source communication device to the first bearer, from the source communication device through the first bearer between the source communication device and the relay UE may be specifically that the relay UE receives the data packet from the remote UE. The data packet is mapped by the remote UE from a Uu bearer to a PC5 RLC bearer between the remote UE and the relay UE based on a configured mapping relationship to transmit to the relay UE.

That the relay UE maps the data packet to the second bearer between the relay UE and the target communication device and transmits the data packet to the target communication device may be specifically that the relay UE identifies the Uu bearer of the remote UE to which the data packet belongs, maps the data packet to the relay bearer between the relay UE and the base station, and transmits the data packet to the base station.

The configured mapping relationship refers to a mapping relationship, which is configured by the base station or pre-configured or predefined, between the Uu bearer and the PC5 RLC bearer. That is, the remote UE maps the data packet from the Uu bearer to the PC5 RLC bearer according to the mapping relationship, which is configured by the base station or pre-configured or predefined, between the Uu bearer and the PC5 RLC bearer.

The PC5 RLC bearer is also referred to as PC5 BH bearer, SL BH bearer, or access BH bearer. The Uu bearer refers to a Uu DRB/SRB. The relay bearer, the relay Uu BH bearer, and the relay air interface bearer are the same and refer to the bearer between the relay UE and the base station.

Exemplarily, the predefined mapping relationship between the Uu bearer and the PC5 RLC bearer may be that a protocol defines that Uu SRB0 is mapped to the PC5 RLC bearer associated with a sidelink logical channel LCID0 (for example merely, it may be LCID1 or otherwise) and that Uu SRB1 is mapped to the PC5 RLC bearer associated with a sidelink logical channel LCID1, and so on.

Specifically, first, the upper layer of the remote UE generates a data packet, maps the data packet or Uu RRC signaling or a Uu RRC message to the PDCP entity of the corresponding Uu DRB/SRB based on 5G Uu QoS processing rules and/or bearer configuration, and performs Uu PDCP layer operations such as header compression, encryption, completion guarantee, and packet encapsulation. Next, the remote UE maps a Uu PDCP PDU to the PC5 RLC bearer between the remote UE and the relay UE. Next, after mapping the Uu PDCP PDU to the PC5 RLC bearer based on a mapping relationship which is configured by the base station or pre-configured or predefined, between the Uu bearer and the PC5 RLC bearer, the remote UE performs RLC/MAC/physical (PHY) layer processing and transmits the data packet to the relay UE through a sidelink resource.

The relay UE receives and parses the data packet from the remote UE, identifies that the data packet is the data packet to be forwarded to the base station, identifies the remote UE Uu bearer to which the data packet belongs, maps the data packet to be forwarded to the relay air interface bearer between the relay UE and the base station, and transmits the data packet to the base station.

After receiving the data forwarded by the relay UE, the base station parses the data packet, identifies the remote UE and Uu bearer corresponding to the data packet, and delivers the data packet to the reception PDCP entity of the corresponding remote UE Uu bearer. If the control plane signaling of the remote UE is received, the base station further delivers the data packet to an RRC layer to process. If user plane data of the remote UE is received, the base station further maps the data packet to the NG interface transmission tunnel of the PDU session of the corresponding remote UE and sends the data packet to a core network network element UPF.

In one example, a manner in which the remote UE maps from Uu bearers to PC5 RLC bearers between the remote UE and the relay UE includes at least one of the following: the remote UE maps Uu bearer data packets to PC5 RLC bearers in a one-to-one manner; or the remote UE maps and/or delivers the data packet on the Uu bearer to an adaptation layer to make the data packet processed by the adaptation layer and maps the data packet processed by the adaptation layer to a PC5 RLC bearer.

If the mapping relationship between either the Uu SRBs of the remote UE and the PC5 RLC bearers or the Uu DRBs of the remote UE and the PC5 RLC bearers is in a one-to-one manner, an adaptation layer is not required between the remote UE and the relay UE. If multiple Uu SRBs or Uu DRBs of the remote UE can be mapped to the same PC5 RLC bearer, the current data packet belongs to which Uu SRB or Uu DRB of the remote UE can be indicated by the adaptation layer between the remote UE and the relay UE. Thus, after the relay UE forwards the data packet to the base station, the base station can identify and deliver the data packet to the reception PDCP entity of the corresponding Uu SRB or Uu DRB. Specifically, the adaptation layer packet header between the remote UE and the relay UE contains the Uu bearer identifier or the Uu bearer index of the remote UE.

In one example, that the remote UE maps and/or delivers Uu bearer data packets to an adaptation layer to make the data packet processed by the adaptation layer includes adding adaptation layer packet headers. An adaptation layer packet header includes at least one of the following: a Uu bearer identifier or index of the remote UE, a relay forwarding indication, a Uu bearer priority of the remote UE, a 5QI, or a QFI.

After receiving the data packet, the relay UE is capable of distinguish between data terminated to the relay UE or data to be forwarded to the other devices by the following methods.

The PC5 RLC bearer dedicated to forwarding data is used. For example, the remote UE and the relay UE, through a PC5 RRC signaling, negotiate which PC5 RLC bearers or logical channels (PC5 RLC bearer identifiers or LCIDs) are dedicated to forwarding data or define which logical channels (for example, all LCIDs between LCD x and LCD y) are dedicated to forwarding data.

The adaptation layer between the remote UE and the relay UE indicates whether the current data packet is the date terminated to the relay UE or the data that needs to be forwarded. For example, the 1 bit or relay forwarding indication field in the adaptation layer packet header indicates whether to relay and forward the data.

The normal unicast connection between the remote UE and the relay UE and the PC5 connection for relay and forwarding correspond to PC5 connections of different source identifiers and target identifiers. Thus, the relay UE can distinguish through the source identifier and the target identifier in a MAC subheader.

Optionally, for the relay UE after receiving the data to be forwarded to map the data to the relay air interface bearer, a PC5 adaptation layer may indicate the 5QI or the QoS configuration information (for example, 5QI, the priority (prioritized bit rate (PBR) or packet error rate (PER)) associated with the 5QI, GFBR/MFBR, and resource type) of the Uu QoS flow to which the data packet belongs or the bearer priority or 5QI of the Uu SRB/DRB to which the data packet belongs.

In summary, if a PC5/SL adaptation layer is introduced between the remote UE and the relay UE, a PC5/SL adaptation layer packet header may include at least one of a Uu bearer identifier or index of the remote UE, a relay forwarding indication, a Uu bearer priority of the remote UE, a 5QI, or a GFBR/MFBR.

In one example, that the relay UE identifies the Uu bearer of the remote UE to which the data packet belongs includes that the relay UE identifies the Uu bearer of the remote UE to which the data packet belongs according to either an one-to-one mapping relationship, acquired from the base station or from predefinition, between Uu bearers of the remote UE and PC5 RLC bearers, or a Uu bearer identifier or a Uu bearer index of the remote UE contained in an adaptation layer packet header.

The relay UE receives and parses the data packet sent by the remote UE, and identifies that the data packet is a data packet that needs to be forwarded to the base station through the PC5 RLC bearer/LCID dedicated to forwarding data and exchanging with the remote UE or the relay forwarding indication in the adaptation layer packet header. The relay UE may identify the remote UE Uu SRB/DRB to which the data packet belongs according to either a one-to-one mapping relationship between the Uu SRB/DRB of the remote UE and the PC5 RLC bearer or the Uu bearer identifier or the Uu bearer index of the remote UE contained in the adaptation layer.

In one example, a manner in which the relay UE maps the data packet to the relay bearer between the relay UE and the base station and transmits the data packet to the base station includes at least one of the following: the relay UE maps the data packet to a Uu RLC bearer associated with a relay UE protocol data unit (PDU) session dedicated for data forwarding to transmit; or the relay UE maps the data packet to a relay Uu BH bearer dedicated for relay data forwarding to send.

In the case where the relay UE maps the data packet to the relay Uu BH bearer dedicated for relay data forwarding, the relay Uu BH bearer has no corresponding PDU session and core network transmission tunnel. Relay Uu BH bearers may be a one-to-one mapping, that is, data of different remote UEs are sent through different relay Uu BH bearers, or may be a many-to-one mapping, that is, data packets of similar QoS of multiple remote UEs may be mapped to the same relay Uu BH bearer to send. A relay UE adaptation layer processes and maps the data packets to the relay Uu BH bearer.

In one example, when the relay Uu BH bearer is a many-to-one mapping, that the relay UE maps the data packets to the relay Uu BH bearer includes that the relay UE adaptation layer adds packet headers to the data packets and maps the data packets to the relay Uu BH bearer. A packet header includes at least one piece of the following information: a remote UE identifier, a remote UE Uu bearer identifier, a PC5 RLC bearer identifier, a logical channel identifier or a logical channel priority associated with the PC5 RLC bearer, or a remote UE Uu bearer priority. The preceding information is added so that the base station can identify which SRB/DRB data of which remote UE the data packet forwarded by the relay UE is.

In one example, a manner in which the relay UE maps the data packets to relay Uu BH bearers includes at least one of the following: the relay UE maps a data packet to a relay Uu BH bearer based on a mapping relationship, which is configured by the base station or pre-configured or predefined, between a PC5 RLC bearer and a relay Uu BH bearer, such as a mapping based on a bearer identifier or a mapping based on a bearer/logical channel priority; the relay UE maps a data packet to relay Uu BH bearers of the same logical channel priority based on the logical channel priority of a PC5 RLC bearer; the relay UE maps a data packet to relay Uu BH bearers of the same bearer or logical channel priority based on the remote UE Uu bearer priority contained in a received PC5 adaptation layer; or the relay UE maps a data packet to a relay Uu BH bearer based on both the 5QI contained in a received PC5 adaptation layer packet header and a mapping relationship, which is configured by the base station or pre-configured, between a 5QI and a relay Uu BH bearer.

In one example, after receiving the data forwarded by the relay UE, the base station parses the data packet. A manner in which the base station identifies the remote UE and the Uu bearer corresponding to the data packet may be identifying according to a relay Uu BH bearer dedicated to forwarding the data of a certain Uu bearer of the remote UE, identifying according to the remote UE identifier in an adaptation layer packet header, a PC5 RLC bearer identifier/logical channel identifier, and the mapping relationship between remote UE Uu bearers and PC5 RLC bearers, or identifying according to the remote UE identifier and the remote UE Uu bearer identifier in an adaptation layer packet header.

In one example, the source communication device is a base station, and the target communication device is a remote UE. That is, the routing of L2 UE-to-Network relay communication data is downlink. The data includes control plane data and user plane data.

Further, that the relay UE receives the data packet, which is mapped by the source communication device to the first bearer, from the source communication device through a first bearer, between the source communication device and the relay UE may be specifically that the relay UE receives the data packet from the base station. The base station maps the data packet from the Uu bearer of the remote UE to the relay bearer between the base station and the relay UE and sends the data packet to the relay UE through the relay bearer.

That the relay UE maps the data packet to the second bearer between the relay UE and the target communication device and transmits the data packet to the target communication device may be specifically that the relay UE maps the data packet to the PC5 RLC bearer between the relay UE and the remote UE and sends the data packet to the remote UE.

Specifically, the base station receives the downlink data from the UPF to the remote UE, maps the downlink remote UE data or RRC signaling messages generated by the base station for the remote UE to the remote UE Uu bearer, and maps the Uu bearer of the remote UE to the relay bearer between the relay UE to send to the relay UE. After receiving the data, the relay UE parses the data, identifies that the data packet is the data packet that needs to be forwarded to the remote UE, maps the data packet to a PC5 bearer, and sends the data packet to the remote UE. The remote UE receives and parses PC5 interface data, identifies the remote UE Uu bearer corresponding to the data packet, and delivers the data packet to the PDCP entity associated with the Uu bearer.

In one example, a manner in which the base station maps the Uu bearer of the remote UE to the relay bearer between the base station and the relay UE includes at least one of the following: the base station maps the remote UE Uu bearer data packet (PDCP PDU) to a relay Uu BH bearer dedicated to forwarding the Uu bearer data of the remote UE; the base station maps the Uu bearer data packet (PDCP PDU) of the remote UE to a Uu RLC bearer associated with a relay UE PDU session dedicated for data forwarding; or the base station delivers the Uu bearer data packet of the remote UE to an adaptation layer to make the data packet processed by the adaptation layer, adds an adaptation layer packet header to the data packet, and maps the data packet to a relay Uu BH bearer dedicated for data forwarding. The relay Uu BH bearer has no corresponding PDU session and NG interface transmission tunnel. The adaptation layer packet header includes at least one of the following: a remote UE identifier, a Uu bearer identifier or index of the remote UE, a Uu bearer priority of the remote UE, a 5QI (the 5QI of the QoS flow corresponding to the data packet), a QoS flow identifier (QFI), a PC5 RLC bearer identifier, or a logical channel identifier.

In one example, the relay UE parses the data after receiving the data and can identify, based on a dedicated forwarding bearer or the remote UE identifier information in the adaptation layer packet header, that the data needs to be forwarded to the remote UE.

In one example, a manner in which the relay UE maps the data packet to the PC5 RLC bearer between the relay UE and the remote UE includes at least one of the following: if the PC5 RLC bearer is a bi-directional bearer, a reverse mapping is performed based on the mapping relationship between an uplink PC5 RLC bearer and a relay Uu BH bearer; a data packet (PDCP PDU) is mapped to the PC5 RLC bearer based on a mapping relationship, which is configured by the base station or pre-configured or predefined, between a relay Uu BH bearer and the PC5 RLC bearer, where the mapping relationship may be a bearer identifier mapping or a bearer/ logical channel priority mapping; a data packet (PDCP PDU) is mapped to PC5 RLC bearers of the same bearer or logical channel priority based on the bearer priority or logical channel priority of a relay Uu BH bearer; the relay UE maps a data packet (PDCP PDU) to the PC5 RLC bearer based on both the Uu bearer identifier or the Uu bearer index of the remote UE or the priority information in an adaptation layer packet header and a mapping relationship, which is configured by the base station or pre-configured or pre-defined, between the Uu bearer of the remote UE and the PC5 RLC bearer, where the mapping relationship may be a bearer identifier mapping or a bearer priority mapping; the relay UE maps a data packet (PDCP PDU) to the PC5 RLC bearer based on both a 5QI or a QFI in an adaptation layer packet header and a mapping relationship, which is configured by the base station or pre-configured or predefined, between a 5QI or a QFI and a PC5 RLC bearer priority; the relay UE maps a data packet (PDCP PDU) to the PC5 RLC bearer based on the PC5 RLC bearer identifier or the logical channel identifier in an adaptation layer packet header, where the data packet (PDCP PDU) may be a data packet with the adaptation layer packet header removed; or the relay UE delivers the parsed data packet of a Uu interface to a PC5 interface adaptation layer to process to make the data packet processed by the adaptation layer, and the data packet is added an adaptation layer packet header and mapped to the PC5 RLC bearer to transmit. The adaptation layer packet header includes at least one of the following: a Uu bearer identifier or index of the remote UE, the Uu bearer priority of the remote UE, a 5QI, or a QFI. When multiple Uu SRBs/DRBs of the remote UE can map to the same relay Uu BH bearer/PC5 RLC bearer, the remote UE, after receiving the data on the PC5 RLC bearer, cannot distinguish which PDCP entity corresponding to the Uu SRB/DRB should the data be delivered to. This can be correctly distinguished by the information in the adaptation layer packet header. Optionally, the adaptation layer packet header includes a relay forwarding indication to indicate whether the received data are the data of the relay or the downlink data that needs to be forwarded.

In one example, a manner in which the remote UE receives and parses PC5 interface data, and identifies the remote UE Uu bearer corresponding to the data packet is as follows: the remote UE delivers the data packet to the corresponding Uu bearer of the remote UE based on a mapping relationship, which is configured by the base station or pre-configured (for example, bearer/logical channel identifier mapping or bearer/logical channel priority mapping), between the Uu bearer of the remote UE and the PC5 RLC bearer; or the remote UE delivers the data packet to the corresponding Uu bearer of the remote UE based on the information in a PC5 interface adaptation layer packet header, such as a remote UE Uu bearer identifier/index or a remote UE Uu bearer priority; or the remote UE delivers the data packet to the corresponding remote UE Uu bearer based on both the 5QI or QFI in the adaptation layer packet header and a mapping relationship, which is configured by the base station or pre-configured, between the remote UE Uu bearer and the 5QI/QFI.

The preceding remote UE identifier in the adaptation layer packet header is used for the relay UE and the base station to identify the remote UE. In one example, the remote UE identifier includes at least one of the following: a UE layer 2 identifier, part of a UE layer 2 identifier, a C-RNTI or local identifier configured by the base station for the remote UE, or a local identifier configured by the relay UE for the remote UE.

The UE layer 2 identifier is a remote UE L2 ID. L2 ID is 24 bits and can be completely contained in the adaptation layer packet header. The air interface overhead is relatively large.

The part of a UE layer 2 identifier is the truncated part of a remote UE L2 ID. For example, the low m bits of an L2 ID are truncated to identify the remote UE. m is any integer among 1 to 24.

A C-RNTI or a local identifier is configured for the remote UE by the base station. The local identifier is unique under the relay UE. The base station can identify the remote UE based on the relay UE and the local identifier. In the case where a C-RNTI is configured, the relay UE can know the C-RNTI of the remote UE. There are some security problems. Specifically, after receiving the PC5 connection establishment request message sent by the remote UE, the relay UE indicates the base station that relay communication is to be performed. For example, the relay UE indicates the base station that relay communication is to be performed based on sidelink UE information. The sidelink UE information includes at least one of the following: the UE type is a relay UE, a relay UE L2 ID, or a remote UE L2 ID, and the base station configures a C-RNTI or a local identifier for the remote UE and sends the C-RNTI or the local identifier to the relay UE.

The relay UE allocates a local identifier to the remote UE. The local identifier is unique under the relay UE. The base station can identify the remote UE based on the relay UE and the local identifier. The length of the local identifier is smaller than the L2 ID or the C-RNTI, saving air interface overhead. Specifically, after receiving the PC5 connection establishment request message sent by the remote UE, the relay UE allocates a local identifier to the remote UE and, when indicating the base station that relay communication is to be performed, carries the local identifier. For example, the relay UE indicates the base station that the relay communication is to be performed based on sidelink UE information. The sidelink UE information includes at least one of the following: the UE type is a relay UE, a relay UE L2 ID, a remote UE L2 ID, or a remote UE local identifier, and the base station configures relay communication resources for the relay UE.

Figure 5:
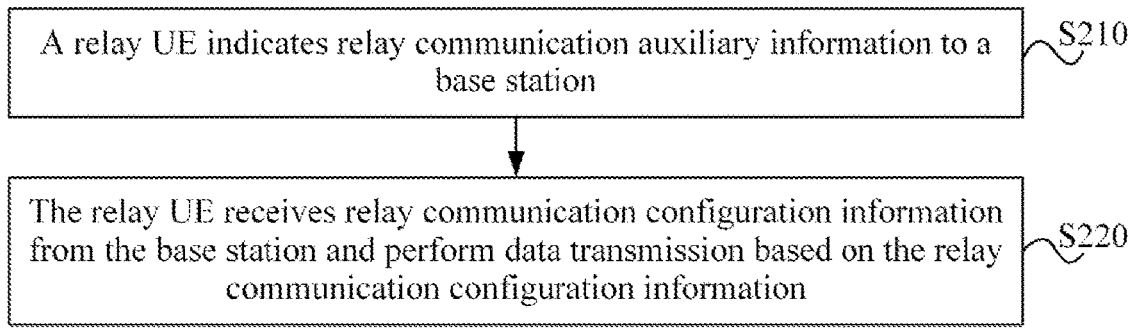
FIG. 5 is a flowchart of a sidelink relay communication method according to the present application.

In an example embodiment, FIG. 5 is a flowchart of a sidelink relay communication method according to the present application. The method can be applied to the case where control plane data and user plane data in the sidelink relay communication of an NR system are forwarded. The method may be executed by a sidelink relay communication apparatus applied to UE-to-network relay communication according to the present application. The sidelink relay communication apparatus may be implemented by software and/or hardware and integrated in a communication device. The communication device may be a relay UE of layer 2 UE-to-Network relay communication.

As shown in FIG. 5, the sidelink relay communication method provided by the present application is applied to layer 2 UE-to-Network relay communication. The method includes the following steps.

In S210, a relay UE indicates relay communication auxiliary information to a base station.

The relay communication auxiliary information refers to information used by the relay UE to indicate the base station that relay communication is performed. In one example, the relay communication auxiliary information includes at least one of the following: a relay communication indication, a relay UE indication, a relay type, serving remote UE information, a communication RAT between a relay UE and a remote UE, or a PC5 communication RAT supported by a relay UE. The relay UE indication is used for indicating a relay UE. The relay type is used for indicating whether it is a UE-to-Network relay or a UE-to-UE relay. The communication RAT may be LTE or NR. For example, after receiving the layer 2 connection establishment request sent by the remote UE, the relay UE sends sidelink UE information (that is, relay communication auxiliary information) to the base station, indicating the base station that relay communication is performed and indicating the remote UE for service. The sidelink UE information includes at least one of the following: as a relay UE indication, a remote UE L2 ID, or a remote UE local identifier (allocated by the relay UE).

In S220, the relay UE receives relay communication configuration information sent by the base station and performs data transmission based on the relay communication configuration information.

After receiving the relay communication auxiliary information indicated by the relay UE, the base station performs relay communication configuration for the relay UE. After receiving the relay communication configuration information sent by the base station, the relay UE performs relay data forwarding after completing communication configuration based on the relay communication configuration information. The relay communication configuration information may be bearer configuration information. The relay UE performs relay data forwarding after completing bearer configuration.

In the preceding solution, the relay UE indicates the base station that relay communication is performed. The base station performs relay communication configuration on a relay base station so that the relay UE performs relay data forwarding after completing configuration based on the relay communication configuration information. Thus, relay data forwarding between a source communication device and a target communication device applicable to the 5G NR system is implemented.

In one example, the relay communication configuration information includes at least one of the following: relay Uu BH bearer configuration, PC5 RLC bearer configuration, or a bearer mapping relationship.

The relay Uu BH bearer configuration includes at least one of the following: a signaling forwarding bearer indication, a data forwarding bearer indication, a bearer identifier, an RLC mode, RLC configuration, a logical channel identifier, a logical channel priority, a logical channel group identifier, or logical channel related configuration.

A PC5 RLC bearer may be divided into a bi-directional PC5 RLC bearer and a uni-directional PC5 RLC bearer. The uni-directional PC5 RLC bearer configuration includes related parameters sent or received by a sidelink bearer. The bi-directional PC5 RLC bearer configuration includes at least one of the following: an RLC acknowledged or unacknowledged mode or related configuration information of other RLC and a logical channel.

The bearer mapping relationship includes at least one of the following: a bearer or logical channel identifier mapping of the relay Uu BH bearer and the PC5 RLC bearer, a bearer or logical channel priority mapping of the relay Uu BH bearer and the PC5 RLC bearer, the mapping relationship between the Uu bearer of the remote UE and the PC5 RLC bearer, or the mapping relationship between a 5QI or a QFI and the PC5 RLC bearer or logical channel priority.

Optionally, the base station configures a PC5 RLC bearer for the relay UE. The PC5 RLC bearer is divided into a bi-directional PC5 RLC bearer and a uni-directional PC5 RLC bearer. The uni-directional PC5 RLC bearer may be divided into an uplink PC5 RLC bearer (sent by the remote UE and received by the relay UE) and a downlink PC5 RLC bearer (sent by the relay UE and received by the remote UE). Uplink PC5 RLC bearer configuration information merely includes SLRB reception related parameters, such as an RLC serial number (SN) size and a logical channel identifier. Downlink PC5 RLC bearer configuration information includes related parameters required for SLRB sending. Bi-directional PC5 RLC bearer configuration information includes an RLC AM mode or a UM mode and other RLC and logical channel related configuration information.

Optionally, the base station configures the mapping relationship between the relay BH bearer and the PC5 RLC bearer. The mapping relationship may further include the mapping relationship between the relay BH bearer and the bi-directional PC5 RLC bearer, the mapping relationship between the relay BH bearer and the downlink PC5 RLC bearer, and the mapping relationship between the uplink PC5 RLC bearer and the relay BH bearer.

It is to be noted that in the case where the PC5 RLC bearer is not configured, it is also possible to configure the mapping relationship between the relay Uu BH bearer and the PC5 RLC bearer, that is, the mapping relationship between the relay Uu BH bearer and the PC5 RLC bearer is independent of the relay Uu BH bearer configuration and the PC5 RLC bearer configuration.

Further, the relay UE forwards remote communication configuration information configured by the base station for the remote UE.

The remote communication configuration information includes at least one of the following: Uu bearer configuration, PC5 RLC bearer configuration, or the mapping relationship between a Uu bearer and a PC5 RLC bearer.

The Uu bearer configuration includes at least one of the following: a bearer identifier, a mapping from a QFI or 5QI to a Uu bearer, whether to carry a service data adaptation protocol (SDAP) packet header, or packet data convergence protocol (PDCP) configuration.

The PC5 RLC bearer is divided into a bi-directional PC5 RLC bearer and a uni-directional PC5 RLC bearer. The uni-directional PC5 RLC bearer configuration includes related parameters sent or received by a sidelink bearer. The bi-directional PC5 RLC bearer configuration includes at least one of the following: an RLC acknowledged or unacknowledged mode or related configuration information of other RLC and a logical channel.

The mapping relationship between the Uu bearer and the PC5 RLC bearer includes at least one of the following: a bearer or logical channel identifier mapping or a bearer or logical channel priority mapping.

Optionally, the base station configures a PC5 RLC bearer for the remote UE. The PC5 RLC bearer is divided into a bi-directional PC5 RLC bearer and a uni-directional PC5 RLC bearer. The uni-directional PC5 RLC bearer may be divided into an uplink PC5 RLC bearer (sent by the remote UE and received by the relay UE) and a downlink PC5 RLC bearer (sent by the relay UE and received by the remote UE). Uplink PC5 RLC bearer configuration information includes related parameters required for SLRB sending. Downlink PC5 RLC bearer configuration information includes SLRB reception related parameters, such as an RLC SN size and a logical channel identifier. Bi-directional PC5 RLC bearer configuration information includes an RLC AM mode or a UM mode and other RLC and logical channel related configuration information.

Optionally, the mapping relationship between the Uu bearer and the PC5 RLC bearer includes the mapping relationship between the Uu bearer and the bi-directional PC5 RLC bearer, the mapping relationship between the Uu bearer and the uplink PC5 RLC bearer, and the mapping relationship between the downlink PC5 RLC bearer and the Uu bearer.

It is to be noted that in the case where the PC5 RLC bearer is not configured, it is also possible to configure the mapping relationship between the Uu bearer and the PC5 RLC bearer, that is, the mapping relationship between the Uu bearer and the PC5 RLC bearer is independent of the Uu bearer configuration and the PC5 RLC bearer configuration.

Further, after the relay UE indicates relay communication auxiliary information to the base station, the base station indicates or updates information of the UE and the remote UE to an AMF entity. The information includes at least one of the following: a remote UE layer 2 identifier, a remote UE radio access network NG application protocol identifier (RAN NGAP ID), a relay UE layer 2 identifier, or a relay UE RAN NGAP ID.

In an embodiment, for an RRC connected state UE performing SL communication, the base station configures an SL bearer for the UE through an RRC proprietary signaling. An RRC idle/inactive UE establishes an SL bearer based on SL bearer configuration in a system message. A non-coverage UE establishes an SL bearer based on the SL bearer configuration in pre-configured information.

Figure 6:
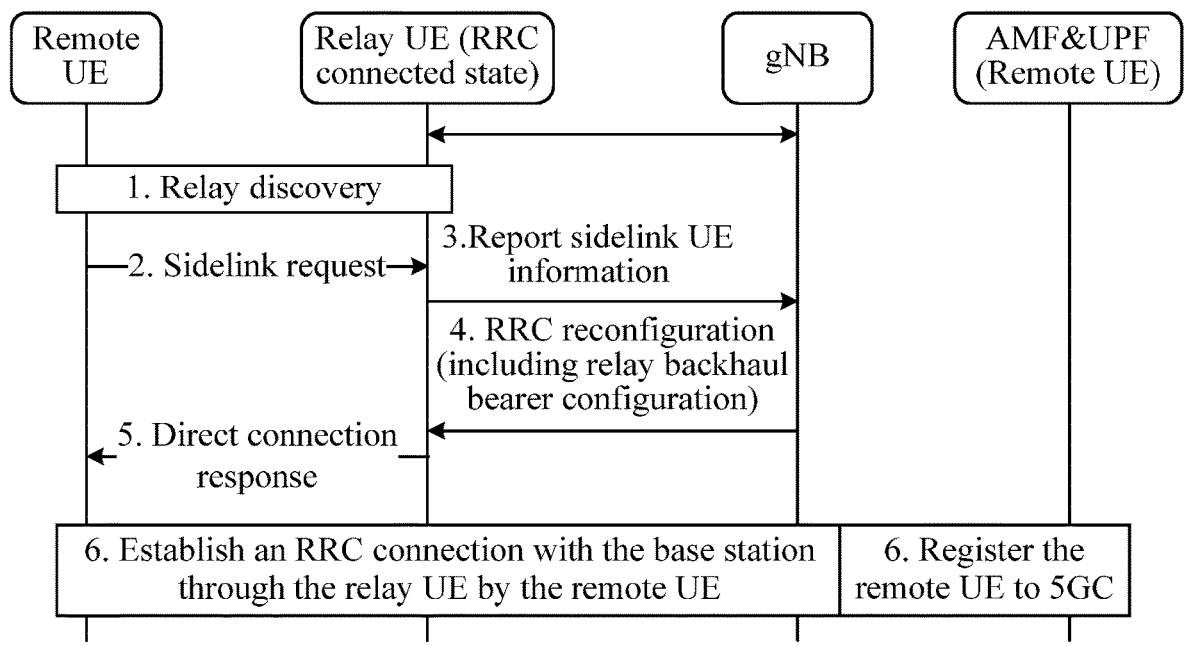
FIG. 6 is a flowchart of a remote UE establishing an RRC connection with a base station through a relay UE according to the present application.

Assuming that UE1 is a non-coverage UE (remote UE), UE2 (relay UE) within coverage is sought for signaling and data forwarding between UE1 and the network. As shown in FIG. 6, after discovering the relay UE, the remote UE establishes layer 2 connection (L2 link/PC5-S link) with the relay UE. Then, the remote UE performs signaling forwarding through the relay UE and establishes RRC connection with the base station. Thus, the base station can configure an SL bearer for the remote UE through an RRC proprietary signaling.

Specifically, after receiving the layer 2 connection establishment request sent by the remote UE, the relay UE sends sidelink UE information to the base station, indicating the base station that relay communication is performed and indicating the remote UE for service. The sidelink UE information includes at least one of the following: as a relay UE indication, a remote UE L2 ID, or a remote UE local identifier (allocated by the relay UE).

The base station configures a relay BH bearer for the relay UE to forward a remote UE signaling. The relay BH bearer contains at least one piece of the following information: a signaling forwarding bearer indication, a bearer identifier/ index, an RLC AM mode, maximum number of re-transmissions, polling related configuration, a logical channel identifier, a logical channel priority, or a logical channel group identifier. Alternatively, defining one or more default signaling forwarding bearers dedicated to forwarding the remote UE signaling does not require the base station to perform bearer configuration.

The relay UE establishes a relay BH bearer (control plane) according to base station configuration and sends an RRC reconfiguration complete message to the base station. At the same time, the relay UE replies the layer 2 connection establishment response message to the remote UE.

The remote UE generates an RRC connection establishment request message and maps the message to a defined default PC5 RLC bearer to send the message to the relay UE. The relay UE processes the data packet according to protocol stacks shown in FIG. 3 and FIG. 4 and sends the data packet to the base station through the relay BH bearer. The base station generates an RRC connection establishment message for the remote UE and maps the message to a relay BH bearer to send the message to the relay UE. The relay UE further forwards the message to the remote UE through a PC5 RLC bearer. The remote UE replies an RRC connection establishment complete message to the base station and performs a registration procedure.

Optionally, when the base station sends the initial UE message related to the remote UE to the AMF (for the remote UE), the relay UE information indicating the remote UE connection includes at least one of the following: a relay UE L2 ID or a relay UE RAN NGAP ID.

Optionally, the base station indicates the newly accessed remote UE information to the AMF of the relay UE. The information includes at least one of the following: a remote UE L2 ID or a remote UE RAN NGAP ID. The information may be sent through an NG interface UE-associated message, such as UE context setup/modification response and uplink non-access stratum (NAS) transport.

To support data forwarding for the remote UE, the relay UE has the following two manners.

One manner is that the relay UE and the network establish a complete PDU session dedicated for data forwarding. The PDU session contains a Uu interface relay BH bearer and an NG-U tunnel. The NG-U tunnel of the relay UE is not used. The NG-U tunnel associated with the remote UE PDU session is used. Specifically, the base station and the core network can maintain the PDU session of the remote UE. After uplink remote UE data arrives at the base station, the base station sends the uplink remote UE data to the UPF of the remote UE through the NG-U tunnel associated with the PDU session of the remote UE. After downlink remote UE data are sent to the base station through the NG-U tunnel associated with the PDU session of the remote UE, the base station sends the downlink remote UE data to the relay UE. The relay UE further forwards the downlink remote UE data to the remote UE. It can be seen that the PDU session-associated NG-U tunnel established by the relay UE and dedicated for data forwarding has no effect. Therefore, the necessity of existence of the NG-U tunnel is not strong.

Another manner is that only a Uu interface relay BH bearer is established, and a complete PDU session for data forwarding need not be established. Therefore, an associated NG-U tunnel need not be maintained.

Figure 7:
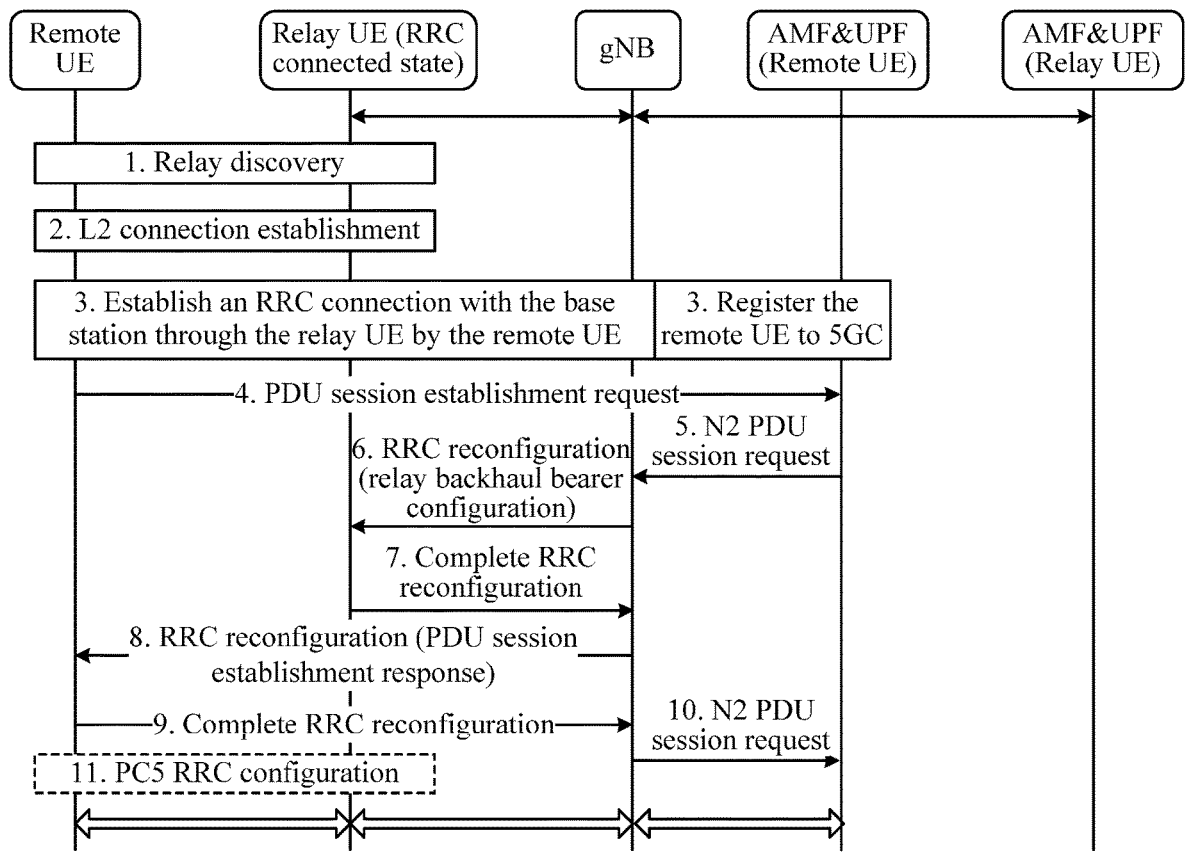
FIG. 7 is a flowchart showing the establishment of an L2 UE-to-Network relay data forwarding bearer according to the present application.

FIG. 7 shows the process of establishing an air interface data forwarding bearer when the relay UE forwards data to the remote UE. After the remote UE establishes an RRC connection with the base station through the relay UE and registers with the core network, the remote UE initiates a PDU session establishment process when the remote UE sends data or the network triggers the UE to initiate the establishment of a PDU session. The 5GC provides QoS information (for example, PDU session AMBR, QoS flow level, and QoS parameters) related to the establishment of the PDU session to the base station. The base station performs data bearer configuration of the remote UE and air interface data forwarding bearer configuration of the relay UE based on the QoS information provided by the 5GC.

The base station configures an air interface data forwarding bearer (relay BH bearer/relay RLC bearer) for the relay UE. The air interface data forwarding bearer configuration includes at least one of the following: a data forwarding bearer indication, a bearer identifier, an RLC mode, a logical channel identifier, a logical channel group identifier, a logical channel priority, priority bit rate, bucket size duration, or RLC related configuration.

Optionally, the base station configures a PC5 RLC bearer for the relay UE. The PC5 RLC bearer is divided into a bi-directional PC5 RLC bearer and a uni-directional PC5 RLC bearer. The uni-directional PC5 RLC bearer may be divided into an uplink PC5 RLC bearer (sent by the remote UE and received by the relay UE) and a downlink PC5 RLC bearer (sent by the relay UE and received by the remote UE). Uplink PC5 RLC bearer configuration information merely includes SLRB reception related parameters, such as an RLC SN size and a logical channel identifier. Downlink PC5 RLC bearer configuration information includes related parameters required for SLRB sending. Bi-directional PC5 RLC bearer configuration information includes an RLC AM mode or a UM mode and other RLC and logical channel related configuration information.

Optionally, the base station configures the mapping relationship between the relay BH bearer and the PC5 RLC bearer. The mapping relationship may further include the mapping relationship between the relay BH bearer and the bi-directional PC5 RLC bearer, the mapping relationship between the relay BH bearer and the downlink PC5 RLC bearer, and the mapping relationship between the uplink PC5 RLC bearer and the relay BH bearer. The mapping relationship between the relay BH bearer and the PC5 RLC bearer includes at least one of the following: a bearer or logical channel identifier mapping of a relay Uu BH bearer and a PC5 RLC bearer, a bearer or logical channel priority mapping of a relay Uu BH bearer and a PC5 RLC bearer, the mapping relationship between the Uu bearer of the remote UE and a PC5 RLC bearer, or the mapping relationship between a 5QI or a QFI and a PC5 RLC bearer or logical channel priority.

Optionally, the base station configures the mapping relationship between a 5QI/QFI and a relay BH bearer. The relay UE maps uplink data to the relay BH bearer based on the 5QI/QFI in the adaptation layer packet header. Optionally, the base station configures the mapping relationship between a 5QI/QFI and a PC5 RLC bearer. The relay UE maps a downlink data packet to the PC5 RLC bearer based on the 5QI/QFI in the adaptation layer packet header and sends the data packet to the remote UE. The preceding configuration information from the base station to the relay UE is sent through an RRC reconfiguration message. The relay UE establishes a relay BH bearer based on the base station configuration and sends a response message to the base station.

The base station configures a Uu DRB and the mapping relationship between the Uu DRB and a PC5 RLC bearer for the remote UE. The remote UE Uu DRB configuration includes at least one of the following: a bearer identifier, a mapping from a QoS flow/QFI/5QI to a DRB, whether to carry an SDAP packet header, or PDCP configuration.

Optionally, the base station configures a PC5 RLC bearer for the remote UE. The PC5 RLC bearer is divided into a bi-directional PC5 RLC bearer and a uni-directional PC5 RLC bearer. The uni-directional PC5 RLC bearer may be divided into an uplink PC5 RLC bearer (sent by the remote UE and received by the relay UE) and a downlink PC5 RLC bearer (sent by the relay UE and received by the remote UE). Uplink PC5 RLC bearer configuration information includes related parameters required for SLRB sending. Downlink PC5 RLC bearer configuration information includes SLRB reception related parameters, such as an RLC SN size and a logical channel identifier. Bi-directional PC5 RLC bearer configuration information includes an RLC AM mode or a UM mode and other RLC and logical channel related configuration information.

Optionally, the mapping relationship between a Uu DRB and a PC5 RLC bearer includes the mapping relationship between a Uu DRB and a bi-directional PC5 RLC bearer, the mapping relationship between a Uu DRB and an uplink PC5 RLC bearer, and the mapping relationship between a downlink PC5 RLC bearer and a Uu DRB. The mapping relationship between a Uu DRB and a PC5 RLC bearer includes at least one of the following: a bearer or logical channel identifier mapping or a bearer or logical channel priority mapping. The preceding configuration information from the base station to the remote UE is sent through an RRC reconfiguration message and forwarded by the relay UE to the remote UE. The remote UE establishes a Uu DRB (SDAP entity and PDCP entity) and a PC5 RLC bearer based on the base station configuration and sends a configuration complete message to the base station.

It is to be noted that steps 6 to 7 and steps 8 to 9 in FIG. 7 are not limited a time sequence. If the base station uniformly configures PC5 RLC bearers (including logical channel identifiers) for the relay UE and the remote UE, the remote UE do not need to exchange PC5 RLC bearer configuration with the relay UE any more. If PC5 RLC bearers are not configured uniformly by the base station, the remote UE needs to exchange PC5 RLC bearer configuration with the relay UE so that the PC5 interface data are received and sent correctly in two directions.

Further, a first communication RAT is used between the relay UE and the remote UE. A second communication RAT is used between the relay UE and the base station. After the remote UE establishes an RRC connection with the base station through the relay UE, the second communication RAT is used between the remote UE and the base station. For an L2 relay, there is a case where the first communication RAT and the second communication RAT are different.

Figure 8:
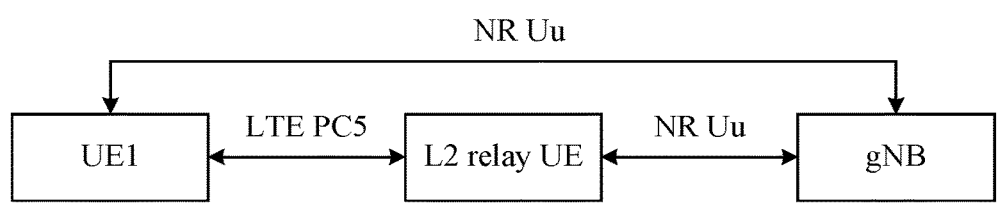
FIG. 8 is a diagram of relay forwarding in different air interface radio access technologies (RATs) according to the present application.

In one example, the first communication RAT is LTE. The second communication RAT is NR. The Uu bearer of the remote UE is an NR Uu bearer. The PC5 RLC bearer is an LTE PC5 RLC bearer. The relay Uu BH bearer is an NR Uu BH bearer. That is, LTE PC5 communication is between the remote UE (UE1) and the relay UE. The base station of the relay UE is an NR base station. NR Uu communication is between the relay UE and the base station. The remote UE is connected to the NR base station through the relay UE, as shown in FIG. 8.

In one example, the mapping relationship between a remote UE NR Uu bearer and an LTE PC5 RLC bearer includes at least one of the following: the mapping relationship between a 5QI or a QFI and a near-field communication ProSe per-packet priority (PPPP), the mapping relationship between the priority in a 5QI and a PPPP, the mapping relationship between Uu bearer QoS and a PPPP, or the mapping relationship between a Uu bearer identifier or priority and a PPPP.

That is, considering the mapping relationship between an NR Uu DRB and an LTE PC5 BH bearer at the remote UE, any of the following mapping relationships may be configured: the mapping relationship between a 5QI/QFI and a PPPP, the mapping relationship between the priority level in a 5QI and a PPPP, the mapping relationship between Uu DRB QoS and a PPPP, or the mapping relationship between a Uu DRB identifier or priority and a PPPP. The Uu DRB QoS is a DRB level QoS parameter, such as a 5QI, GFBR/MFBR, and AMBR.

The preceding mapping relationships may be configured by the base station, or pre-configured, configured by ProSe or a vehicle-to-everything (V2X) control function, or configured by OAM, or defined by a protocol.

In one example, the bearer mapping relationship acquired by the relay UE includes at least one of the following: the mapping relationship between a relay Uu BH bearer or logical channel priority and a PPPP, the mapping relationship between the Uu bearer of a remote UE and a relay Uu BH bearer, the mapping relationship between a 5QI or a QFI and a relay Uu BH bearer, or the mapping relationship between a remote UE NR Uu bearer and an LTE PC5 RLC bearer. Relay data forwarding is implemented according to one of the mapping relationships. That is, to support relay UE data forwarding, any of the following mapping relationships may be configured: the mapping relationship between a relay BH bearer/logical channel priority and a PPPP, the mapping relationship between a remote UE Uu DRB and a relay BH bearer, the mapping relationship between a 5QI or a QFI and a relay Uu backhaul bearer, or the mapping relationship between a remote UE NR Uu bearer and an LTE PC5 RLC bearer. The mapping relationship may be configured by a base station, or pre-configured, or configured by ProSe or a V2X control function, or configured by OAM, or defined by a protocol. Optionally, the relay UE acquires the mapping relationship between the NR Uu DRB of the remote UE and an LTE PC5 bearer. The mapping relationship may be configured by a base station, or pre-configured, or configured by OAM, or defined by a protocol.

Figure 9:
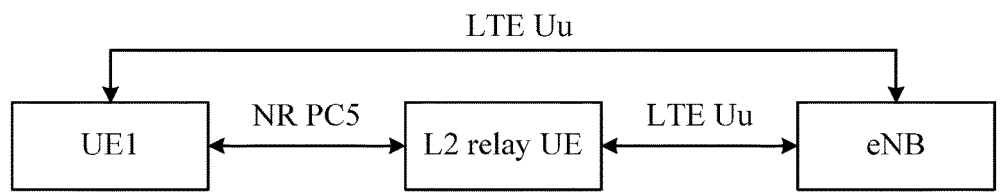
FIG. 9 is a diagram of relay forwarding in different air interface RATs according to the present application.

In one example, the second communication RAT is LTE. The first communication RAT is NR. The Uu bearer of the remote UE is an LTE Uu bearer. The PC5 RLC bearer is an NR PC5 RLC bearer. The relay Uu BH bearer is an LTE Uu BH bearer. That is, as shown in FIG. 9, NR PC5 is between UE1 and the relay UE. The relay UE is connected to the LTE base station. LTE Uu is between the relay UE and the base station. UE1 is connected to the LTE base station through the relay UE. UE1 Uu is LTE Uu.

In one example, the mapping relationship between a remote UE LTE Uu bearer and an NR PC5 RLC bearer includes at least one of the following: the mapping relationship between a QCI and a PQI, the mapping relationship between a Uu bearer identifier or priority or a QCI and a PC5 RLC bearer logical channel priority, or the mapping relationship between a Uu bearer identifier and a PC5 RLC bearer logical channel identifier.

That is, considering the mapping relationship between LTE Uu DRB and an NR PC5 BH bearer at the remote UE, any of the following mapping relationships may be configured: the mapping relationship between a QCI and a PQI, the mapping relationship between a Uu bearer identifier or priority or a QCI and a PC5 RLC bearer logical channel priority, or the mapping relationship between a Uu bearer identifier and a PC5 RLC bearer logical channel identifier. The mapping relationship may be configured by a base station, or pre-configured, or configured by ProSe or a V2X control function, or configured by OAM, or defined by a protocol.

In one example, the bearer mapping relationship acquired by the relay UE includes at least one of the following: the mapping relationship between a QCI and a PQI, the mapping relationship between a PC5 RLC bearer logical channel priority and a relay Uu BH bearer logical channel priority, the mapping relationship between a remote UE Uu bearer and a relay Uu BH bearer, the mapping relationship between a QCI and a PC5 RLC bearer logical channel priority, the mapping relationship between a PQI and a relay Uu BH bearer logical channel priority, or the mapping relationship between a remote UE LTE Uu bearer and an NR PC5 RLC bearer.

That is, to support relay UE data forwarding, any of the following mapping relationships may be configured: the mapping relationship between a QCI and a PQI, the mapping relationship between a PC5 BH bearer logical channel priority and a relay BH bearer logical channel priority, the mapping relationship between remote UE Uu DRB and a relay BH bearer, the mapping relationship between a QCI and a PC5 BH bearer logical channel priority, the mapping relationship between a PQI and a relay BH bearer logical channel priority, or the mapping relationship between a remote UE LTE Uu bearer and an NR PC5 RLC bearer. The mapping relationship may be configured by a base station, or pre-configured, or configured by ProSe or a V2X control function, or configured by OAM, or defined by a protocol. Optionally, the relay UE acquires the mapping relationship between the LTE Uu DRB of the remote UE and an NR PC5 BH bearer. The mapping relationship may be configured by a base station, or pre-configured, or configured by OAM, or defined by a protocol.

Figure 10:
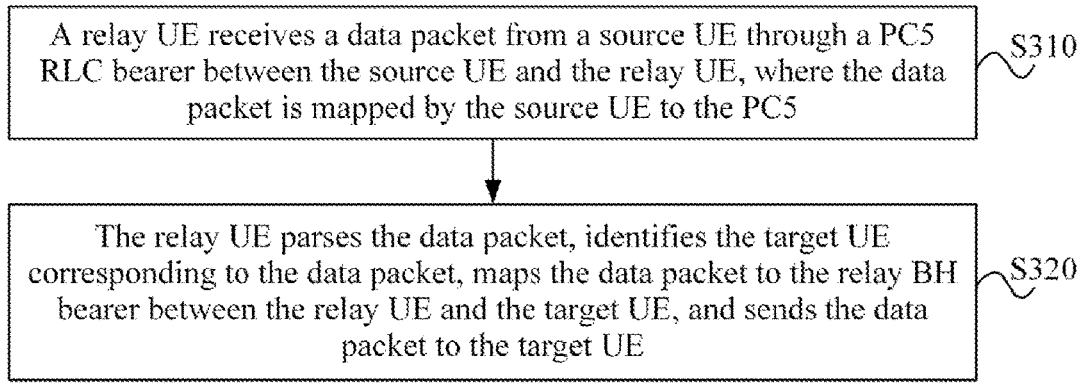
FIG. 10 is a flowchart of a sidelink relay communication method according to the present application.

In an example embodiment, FIG. 10 is a flowchart of a sidelink relay communication method according to the present application. The method can be applied to the case where control plane data and user plane data in the sidelink relay communication of an NR system are forwarded. The method may be executed by a sidelink relay communication apparatus applied to UE-to-UE relay communication according to the present application. The sidelink relay communication apparatus may be implemented by software and/or hardware and integrated in a communication device. The communication device may be a relay UE of layer 2 UE-to-UE relay communication.

As shown in FIG. 10, the sidelink relay communication method provided by the present application is applied to layer 2 UE-to-UE relay communication. The method includes the following steps.

In S310: a relay UE receives a data packet from a source UE through the PC5 RLC bearer between the source UE and the relay UE. The data packet is mapped by the source UE to the PC5 RLC bearer.

In S320: the relay UE parses the data packet, identifies the target UE corresponding to the data packet, maps the data packet to the relay BH bearer between the relay UE and the target UE, and sends the data packet to the target UE.

The source UE and the target UE perform data forwarding through the relay UE. For an L2 UE-to-UE relay, the source UE and the target UE can establish a unicast link (L2 link/PC5-S link) through the relay UE, perform PC5 RRC signaling exchange, and maintain an end-to-end PDCP.

In the preceding solution, the source UE maps the data packet to the PC5 RLC bearer between the source UE and the relay UE and sends the data packet to the relay UE. The relay UE receives and parses the data packet, identifies the target UE corresponding to the data packet, maps the data packet to the relay BH bearer between the relay UE and the target UE, and sends the data packet to the target UE. Thus, relay data forwarding between the source communication device and the target communication device applicable to a 5G NR system is implemented.

Figure 11:
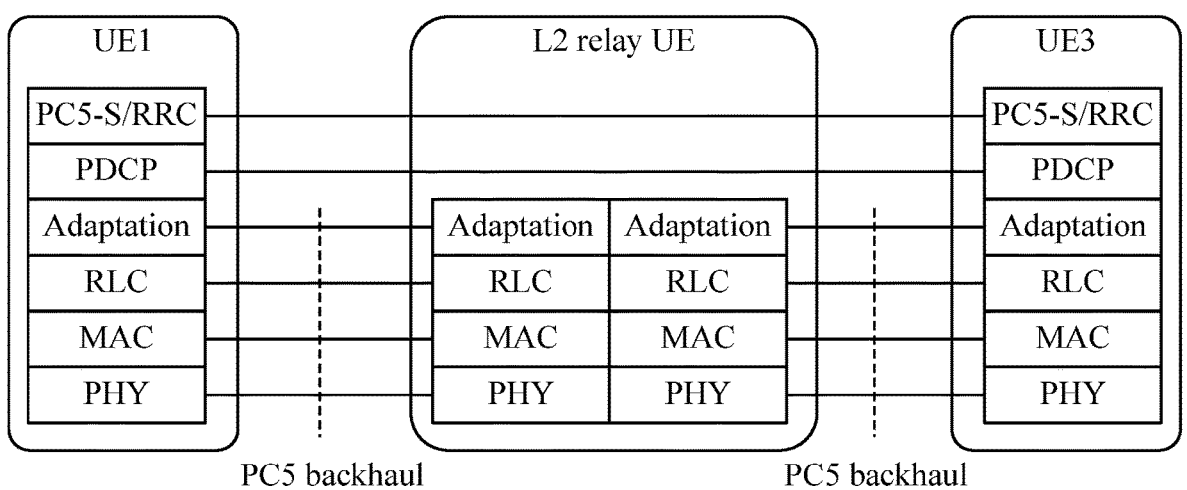
FIG. 11 is a diagram of an L2 UE-to-UE relay control plane protocol stack according to the present application.
Figure 12:
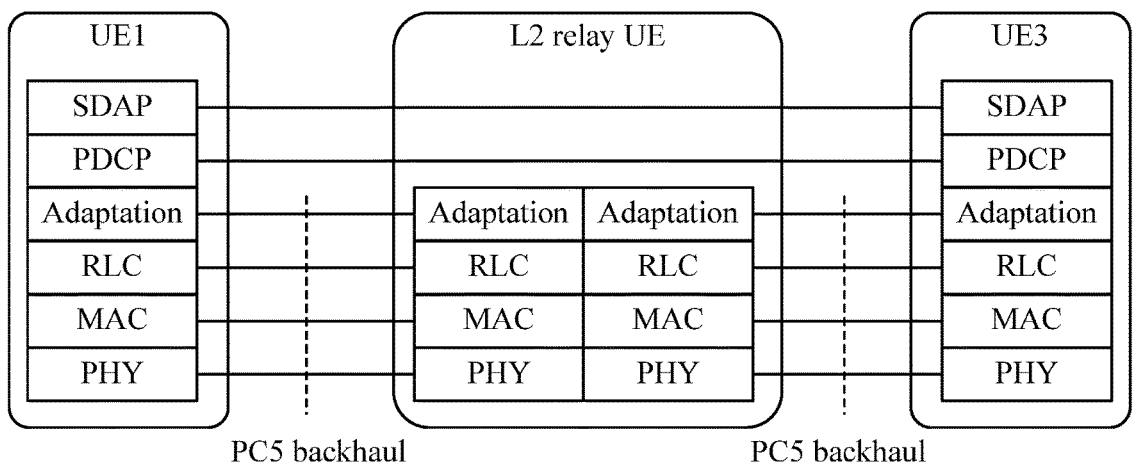
FIG. 12 is a diagram of an L2 UE-to-UE relay user plane protocol stack according to the present application.

Considering that the relay UE may serve multiple remote UE pairs at the same time, a sending UE needs to indicate a target remote UE when sending data to the relay UE. The relay UE needs to indicate a source sending remote UE when forwarding data to the target remote UE. A reception UE/target UE needs to be able to identify which SLRB the data received from the PC5 BH bearer corresponds to and deliver the data to the corresponding PDCP entity. Therefore, an adaptation layer is required for data routing processing between the source UE and the relay UE and/or the relay UE and the target UE. An L2 UE-to-UE relay control plane protocol stack is shown in FIG. 11. A user plane protocol stack is shown in FIG. 12.

Assuming that UE1 is a source sending UE, UE3 is a target UE, the connection between UE1 and the relay UE is referred to as access BH, and the connection between the relay UE and UE3 is relay BH, the control plane and user plane data routing processing is as follows.

Signaling or data with the same/similar signaling priority or similar QoS forwarded by UE1 to different target UEs through the relay UE may be mapped to the same access BH bearer to send to the relay UE. Signaling or data with the same/similar signaling priority or similar QoS from different remote UEs sent by the relay UE to the same target UE may be mapped to the same relay BH bearer to send to the target UE.

For control plane data, UE1 generates a PC5-S/PC5 RRC signaling message for a source target UE pair {UE1, UE3}, maps the signaling message to the PDCP entity of the SL SRB of the corresponding source target UE pair based on bearer configuration, and performs PDCP layer operations, such as header compression, encryption, completion guarantee, and packet encapsulation. For user plane data, the upper layer of UE1 performs QoS processing on the data between a source target UE pair {UE1, UE3}, obtains a QoS flow through QoS rules, and delivers QoS flow data to the SDAP entity of the corresponding source target UE pair at the access stratum (AS). An SDAP layer maps the data packet to the PDCP entity of the corresponding SL DRB based on base station-configured or pre-configured SL DRB configuration and the mapping relationship from the QoS flow to the SL DRB and performs PDCP layer operations such as header compression, encryption, completion, and packet encapsulation.

In one example, before the data packet is mapped to a PC5 RLC bearer by the source UE, the source UE delivers the data packet to an adaptation layer to make the data packet processed by the adaptation layer. The adaptation layer processing includes adding an adaptation layer packet header. The adaptation layer packet header includes at least one of the following: a target UE identifier, a source UE identifier, a sidelink bearer identifier, a signaling bearer priority, or a PQI, a PFI, a 5QI, or a QFI.

The adaptation layer packet header refers to the adaptation layer packet header added by a source UE adaptation layer for a data packet. If the SL SRB of UE1 for sending a PC5-S/PC5-RRC message or the SL DRB of UE1 for sending data and an access BH bearer is a one-to-one mapping, the adaptation layer packet header may merely carry a target UE identifier. If the SL SRB of UE1 for sending a PC5-S/PC5-RRC message or the SL DRB of UE1 for sending data and an access BH bearer is a many-to-one mapping (multiple SL SRBs/DRBs may be mapped to the same access BH bearer), the adaptation layer packet header carries a target UE identifier and an SL SRB/DRB identifier. Optionally, the adaptation layer packet header carries a PQI/PFI/5QI/QFI corresponding to a signaling bearer priority or a data packet, which can be used for the relay UE to perform relay BH bearer mapping.

In one example, before the relay UE maps the data packet to the relay BH bearer between the relay UE and the target UE, the method further includes the relay UE processing the data packet by an adaptation layer. The adaptation layer processing includes adding an adaptation layer packet header. The adaptation layer packet header includes at least one of the following: a source UE identifier, a target UE identifier, a sidelink bearer identifier, a PC5 RLC bearer identifier or an associated logical channel identifier, or a sidelink bearer priority.

The adaptation layer packet header refers to the adaptation layer packet header added by a relay UE adaptation layer for a data packet.

Specifically, UE1 delivers an SL PDCP PDU to an adaptation layer to make the SL PDCP PDU processed by the adaptation layer, maps the encapsulated adaptation layer adapt PDU to the access BH bearer (also referred to as PC5/SL backhaul/RLC bearer) between UE1 and the relay UE, and sends the encapsulated adaptation layer adapt PDU processed by RLC/MAC/PHY to the relay UE. The relay UE receives the data packet from UE1, parses the data packet to the adaptation layer, identifies the target UE through the information in an adaptation layer packet header, and identifies the SL SRB/DRB corresponding to the data packet. Then, the parsed data packet is re-processed through the adaptation layer and added an adaptation layer packet header. The adapt PDU encapsulated by the adaptation layer is mapped to the relay BH bearer between the relay UE and the target UE to send to the target UE. After receiving the data packet, the target UE parses the data packet, identifies the source sending UE and the SL bearer (SL SRB/DRB) corresponding to the data packet, and delivers the data packet to the reception PDCP entity of the SL bearer of the corresponding source target UE pair. If a control plane signaling is received from the source UE, the target UE further delivers the data packet to the RRC layer/PC5-S to process. If user plane data of the source UE is received, the target UE further delivers the data packet to the SDAP layer and the application layer.

Optionally, the source sending UE maps the encapsulated adaptation layer adapt PDU to the access BH bearer between the source sending UE and the relay UE based on a mapping relationship, which is defined by a protocol, or configured by the base station, or pre-configured, between an SL SRB/DRB and an access BH bearer or between an SL SRB/DRB and an LCD (LCID-associated access BH bearer), such as SL SRB0 mapping to the LCID1-associated access BH bearer, SL SRB1 mapping to the LCID2-associated access BH bearer, and so on.

In one example, the relay UE identifies the target UE corresponding to the data packet, including the relay UE identifying the sidelink bearer of the target UE corresponding to the data packet. A manner in which the relay UE identifies the sidelink bearer of the target UE corresponding to the data packet includes at least one of the following: identifying through a sidelink bearer identifier in an adaptation layer packet header; identifying based on a mapping relationship, which is defined by the protocol, or configured by the base station, or pre-configured, between a sidelink bearer and a PC5 RLC bearer or an LCID; or identifying through the source UE based on a PC5 RRC signaling informing the mapping relationship between the sidelink bearer of the relay UE and a PC5 RLC bearer or an LCD.

Specifically, UE1 informs the relay UE of the mapping relationship between an SL SRB/DRB and an access BH bearer/LCID through a PC5 RRC signaling. Specifically, the PC5 RRC configuration information from UE1 to the relay UE includes at least one of the following: a source UE identifier, a target UE identifier, or an access BH bearer/logical channel identifier associated with each SL SRB/DRB.

In one example, a manner in which the relay UE maps the data packet to the relay BH bearer between the relay UE and the target UE, that is, a manner in which the adapt PDU encapsulated by the adaptation layer is mapped to the relay BH bearer between the relay UE and the target UE, includes at least one of the following: the relay UE maps the forwarded data packet to the relay BH bearer based on a mapping relationship, which is defined by the protocol or configured by the base station, or pre-configured, between a PC5 RLC bearer and a relay BH bearer, such as a mapping based on a bearer identifier or a mapping based on a bearer/logical channel priority; the relay UE maps the data packet to relay BH bearers of the same logical channel priority based on the logical channel priority of a PC5 RLC bearer; the relay UE maps the data packet to relay BH bearers of the same bearer or logical channel priority based on the sidelink bearer identifier or signaling bearer priority contained in a received adaptation layer packet header; the relay UE maps the data packet to the relay BH bearer associated with the corresponding LCID based on both the sidelink bearer identifier or bearer priority contained in a received adaptation layer packet header and a mapping relationship, which is defined by the protocol, or configured by the base station, or pre-configured, between a sidelink bearer or bearer priority and an LCID; or the relay UE maps the data packet to a relay BH bearer based on both the 5QI, PQI, PFI, or QFI contained in a received adaptation layer packet header and a mapping relationship, which is configured by the base station, or pre-configured, between a 5QI, PQI, PFI, or QFI and a relay BH bearer.

After receiving the data packet, the target UE parses the data packet and identifies the source sending UE and the SL bearer (SL SRB/DRB) corresponding to the data packet in the following manners.

If a one-to-one mapping is configured, the target UE can identify the source UE and the SL bearer according to the received relay BH bearer.

The source UE and the SL bearer can be identified according to the information in an adaptation layer packet header, such as a source UE identifier, an SL SRB identifier/priority, or a logical channel identifier associated with an access BH bearer.

The source UE and the SL bearer can be identified according to the information in an adaptation layer packet header, such as a source UE identifier and an SL DRB identifier.

The source UE and the SL bearer can be identified according to the information in an adaptation layer packet header, such as a source UE identifier, a 5QI/PFI/PFI/QFI, and a mapping relationship, which is configured by the base station or pre-configured, between an SL DRB and a 5QI/PFI/PFI/QFI.

In summary, the adaptation layer packet header on the access BH link between the sources UE and the relay UE may carry at least one of the following: a target UE identifier, an SL bearer identifier, a bearer priority, or a PFI/PFI/5QI/QFI corresponding to the data packet. The adaptation layer packet header on the relay BH link between the relay UE and the target UE may carry at least one of the following: a source UE identifier, an SL bearer identifier, a logical channel identifier associated with an access BH bearer, a bearer priority, or a PFI/PFI/5QI/QFI corresponding to the data packet.

Optionally, to ensure end-to-end delay, it is considered that the source UE carries timestamp information in the adaptation layer packet header. Then, the relay UE retains the timestamp information in the adaptation layer packet header when forwarding data. After receiving the data, the target UE can determine the end-to-end delay according to the timestamp information of the source UE and current time. Alternatively, the source UE or the base station of the source UE configures the delays that an access BH bearer and a relay BH bearer need to meet (that is, the delay on each PC5 BH link) based on service delay requirements. This can be embodied in the configuration of an adaptation layer packet discard timer. If a data packet has not been transmitted after the timer expires, the data packet is discarded.

The source UE identifier and the target UE identifier are one of the following: an L2 ID, an identifier that the source UE and the target UE negotiate to allocate, a local identifier that the relay UE allocates to the source UE and the target UE, or an application layer identifier.

Figure 13:
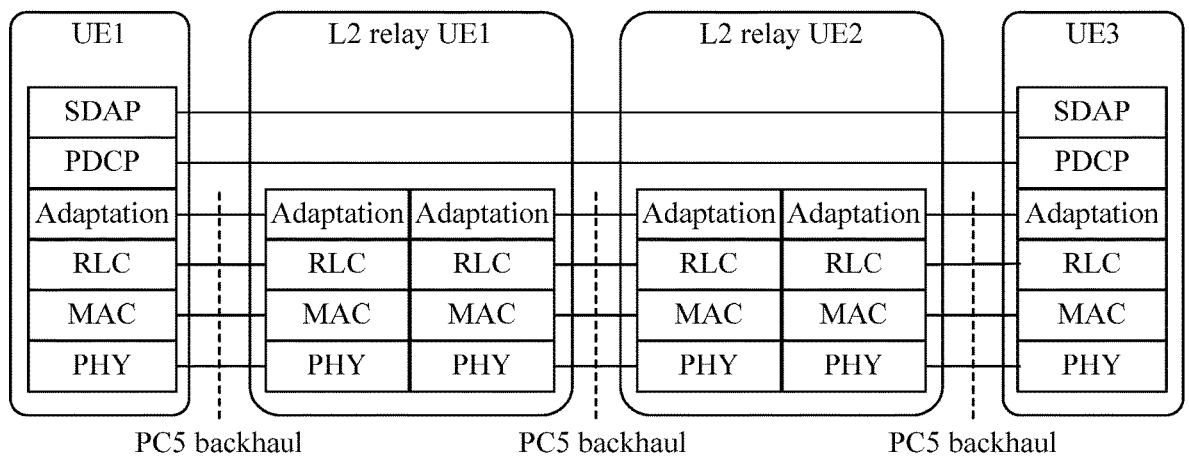
FIG. 13 is a diagram of a multi-hop L2 UE-to-UE relay protocol stack according to the present application.

For the case of a multi-hop relay, as shown in FIG. 13, when relay UE1 forwards the data from UE1 to UE3 to relay UE2, relay UE2 needs to know which source UE the data are from and which target UE the data are sent to. Therefore, the adaptation layer packet header on the PC5 BH link (which may be referred to as intermediate relay BH) between relay UE1 and relay UE2 needs to carry at least a source UE identifier and a target UE identifier. In addition, as described above, in order that relay UE2 or final UE3 can identify the corresponding SL bearer, the adaptation layer packet header may carry an SL bearer identifier. Optionally, to assist relay UE2 to perform bearer mapping, the adaptation layer packet header may carry a PFI/PFI/5QI/QFI or the like corresponding to a bearer priority/data packet.

Optionally, if UE1 can send data from different source UE IDs to different target UE IDs through the access BH link (between UE1 and relay UE1), the UE1 adaptation layer needs to carry a source UE identifier. Similarly, the adaptation layer between relay UE2 and target UE3 needs to carry a target UE identifier. Therefore, in this case, adaptation layer packet headers of the source UE, intermediate relay UEs, and the target UE have the same format and carry the same information. At least the source UE identifier and the target UE identifier need to be carried.

Figure 14:
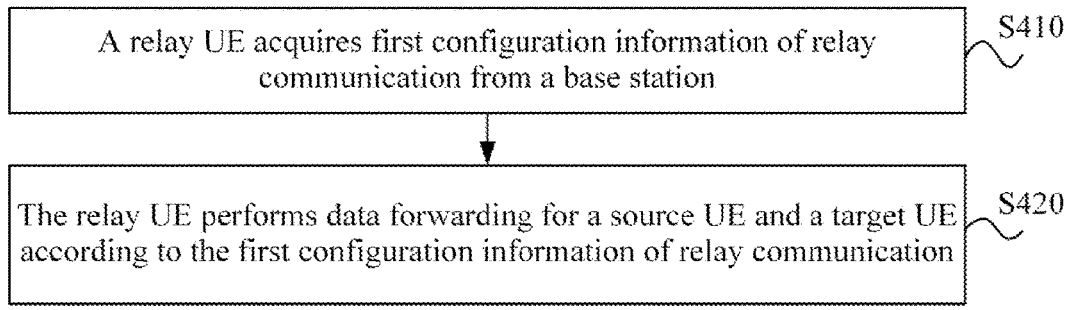
FIG. 14 is a flowchart of a sidelink relay communication method according to the present application.

In an example embodiment, FIG. 14 is a flowchart of a sidelink relay communication method according to the present application. The method can be applied to the case where control plane data and user plane data in the sidelink relay communication of an NR system are forwarded. The method may be executed by a sidelink relay communication apparatus applied to UE-to-UE relay communication according to the present application. The sidelink relay communication apparatus may be implemented by software and/or hardware and integrated in a communication device. The communication device may be a relay UE of layer 2 UE-to-UE relay communication.

As shown in FIG. 10, the sidelink relay communication method provided by the present application is applied to layer 2 UE-to-UE relay communication. The method includes the following steps.

In S410, a relay UE acquires first configuration information of relay communication from a base station.

The first configuration information of relay communication refers to configuration information for the base station to perform relay communication configuration for the relay UE, and may be bearer configuration information.

In S420, the relay UE performs data forwarding for a source UE and a target UE according to the first configuration information of relay communication.

After completing bearer configuration establishment according to the bearer configuration information from the base station, the relay UE performs relay data forwarding for the source UE and the target UE.

In the preceding solution, the relay UE receives the first configuration information of relay communication from the base station so that the relay UE performs relay data forwarding for the source UE and the target UE after completing configuration according to the first configuration information of relay communication. Thus, relay data forwarding between a source communication device and a target communication device applicable to the 5G NR system is implemented.

Specifically, before the relay UE acquires the first configuration information of relay communication, the method further includes the relay UE reporting forwarded service data related information to the base station. The forwarded service data related information includes at least one of the following: QoS information of service to be transmitted between the source UE and target UE3, end-to-end sidelink bearer configuration between the source UE and the target UE, or PC5 RLC bearer configuration between the source UE and the relay UE.

Specifically, the base station receives the forwarded service data related information reported by the relay UE, performs relay communication configuration for the relay UE based on the forwarded service data related information, and sends the first configuration information of relay communication to the relay UE. The first configuration information of relay communication includes at least one of the following: the relay BH bearer between the relay UE and the target UE or the mapping relationship between the PC5 RLC bearer between the source UE and the relay UE and a relay BH bearer.

Further, the relay communication method further includes the source UE acquiring second configuration information of relay communication from the base station; and the source UE communicating with the target UE through the relay UE according to the second configuration information of relay communication.

Specifically, before the source UE acquires the second configuration information of relay communication from the base station, the source UE reports sidelink terminal information to the base station. The sidelink terminal information includes at least one of the following: a remote UE indication, a target UE identifier, QoS flow information corresponding to a target UE identifier, or a relay UE identifier.

Specifically, the base station receives the sidelink terminal information reported by the source UE, performs relay communication configuration for the source UE based on the sidelink terminal information, and sends the second configuration information of relay communication to the relay UE. The second configuration information of relay communication includes at least one of the following: end-to-end sidelink bearer configuration between the source UE and the target UE, PC5 RLC bearer configuration between the source UE and the relay UE, or the mapping relationship between the end-to-end sidelink bearer between the source UE and the target UE and the PC5 RLC bearer between the source UE and the relay UE.

The end-to-end sidelink bearer configuration between the source UE and the target UE includes any one of the following: a target UE identifier, a bearer identifier or index, a mapping from a QoS flow to a sidelink bearer, whether to carry an SDAP subheader, PDCP configuration, or the PC5 RLC bearer identifier or index between a source UE and a relay UE associated with the source UE.

Specifically, before the source UE communicates with the target UE through the relay UE according to the second configuration information of relay communication, the source UE, through a PC5 RRC signaling, exchanges the PC5 RLC bearer configuration between the source UE and the relay UE, the QoS information of service to be transmitted between the source UE and target UE3, and the end-to-end sidelink bearer configuration between the source UE and the target UE with the relay UE; and/or, the source UE, through forwarding a PC5 RRC signaling by the relay UE, exchanges the end-to-end sidelink bearer configuration between the source UE and the target UE with the target UE.

In an embodiment, assuming that UE1 is in the RRC connected state under gNB1 and UE3 is in a non-coverage state, UE1 finds a relay UE and communicates with UE3 through the relay UE. The relay UE is in the RRC connected state under gNB2.

Figure 15:
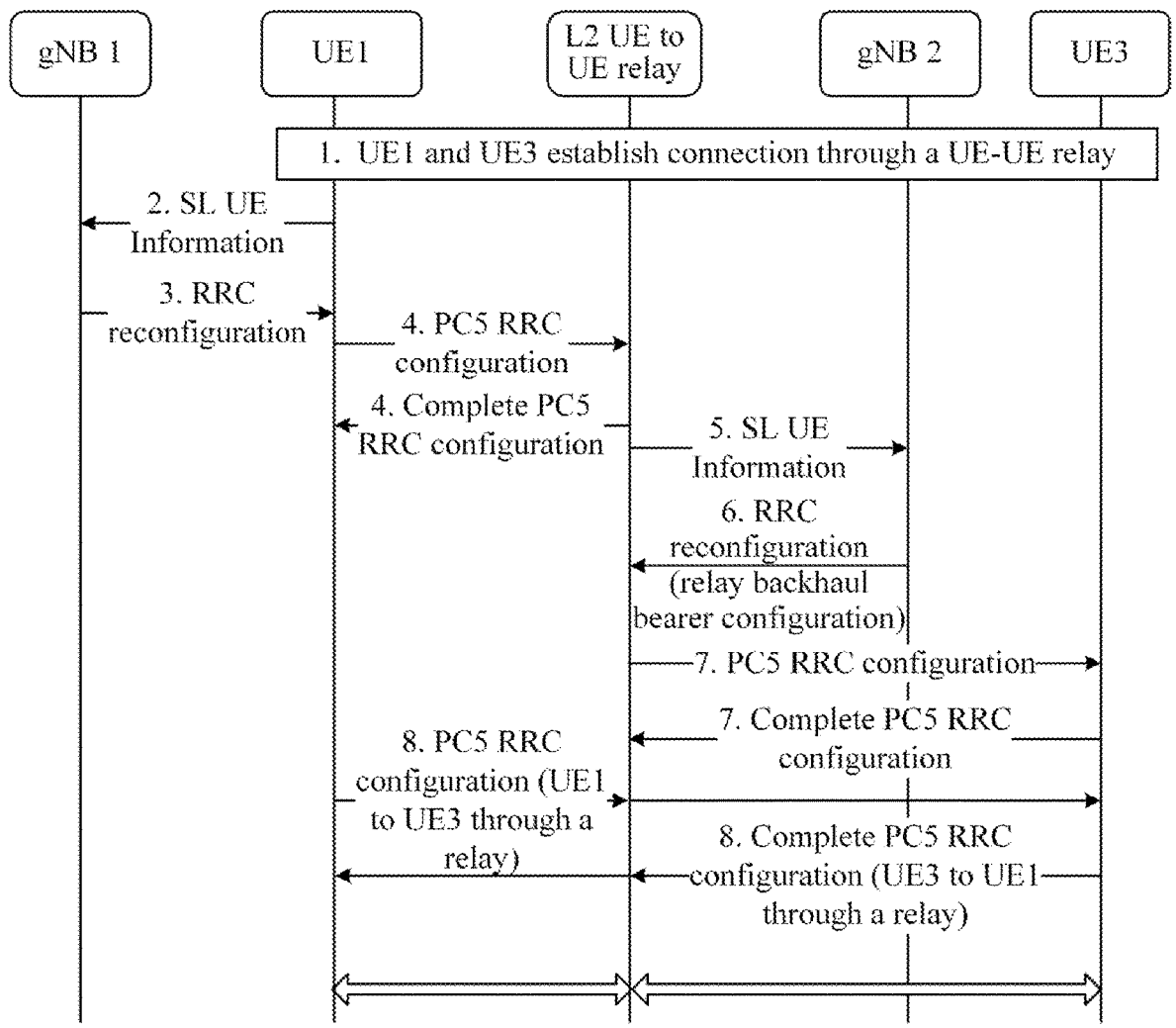
FIG. 15 is a flowchart showing the establishment of an L2 UE-to-UE relay bearer according to the present application.

As shown in FIG. 15, UE1 discovers UE3 through a relay UE. UE1 and the relay UE, and the relay UE and UE3 separately establish an L2 link for data forwarding. A PC5-S connection establishment request message indicates relay forwarding. UE1 and UE3 establish an L2 link through the relay UE and exchange service types and QoS information service/QoS info.

UE1 sends sidelink UE information to the base station and reports the target UE, the relay UE, and the QoS information of communication. That is, the sidelink UE information includes at least one piece of the following information: a target UE identifier (for example, a UE3 identifier), QoS flow information corresponding to a target UE identifier, or a relay UE identifier. The QoS flow information includes any combination of the following: a PFI, a PQI, GFBR/MFBR, and a communication range.

gNB1 performs bearer configuration based on the information reported by UE1. The bearer configuration includes at least one of the following: the end-to-end sidelink bearer configuration between the source UE and the target UE, the PC5 BH bearer configuration between the source UE and the relay UE, and the mapping relationship between the end-to-end sidelink bearer between the source UE and the target UE and the PC5 BH bearer between the source UE and the relay UE. The end-to-end sidelink bearer configuration between the source UE and the target UE includes any one of the following: a target UE identifier, a bearer identifier/index, a mapping from a QoS flow to an SL DRB, whether to carry an SDAP subheader, PDCP configuration, or the PC5 BH bearer identifier/index between the associated source UE and relay UE. The PC5 BH bearer configuration between the source UE and the relay UE includes any of the following: a relay UE identifier, a PC5 BH bearer identifier/index, an end-to-end sidelink bearer identifier/index between the associated source UE and target UE, a logical channel identifier, a logical channel group identifier, a logical channel priority, an RLC mode, an RLC SN size, an RLC AM polling related parameter, PBR, or bucket size duration (BSD). Optionally, the relay BH bearer configuration between the relay UE and the target UE contained in the bearer configuration information sent by gNB1 to UE1 includes at least one of the following: a relay BH bearer identifier/index, RLC, a logical channel, or MAC related configuration.

UE1 receives base station configuration and exchanges the PC5 BH bearer configuration between the source UE and the relay UE with the relay UE through a PC5 RRC signaling. Optionally, UE1 sends the QoS information of service to be transmitted between UE1 and UE3 to the relay UE through a PC5 RRC message so that the relay UE acquires or configures a relay BH bearer. The QoS information of service to be transmitted between UE1 and UE3 includes at least one of the following: a target UE identifier (such as a UE3 identifier), QoS flow information corresponding to a target UE identifier, or a relay UE identifier. The QoS flow information includes any combination of the following: a PFI, a PQI, GFBR/MFBR, and a communication range. Optionally, UE1 sends the end-to-end sidelink bearer configuration between the source UE and the target UE configured by the base station to the relay UE through a PC5 RRC message.

The relay UE reports forwarded service data related information to the base station of the relay UE. The information includes at least one of the following: the QoS information of service to be transmitted between UE1 and UE3, the end-to-end sidelink bearer configuration between the source UE and the target UE, or the PC5 BH bearer configuration between the source UE and the relay UE. The QoS information of service to be transmitted between UE1 and UE3 is from UE1 sending to the relay UE through a PC5 RRC message or carried in an adaptation layer packet header.

The base station configures the relay BH bearer between the relay UE and the target UE and the mapping relationship between the PC5 BH bearer and the relay BH bearer between the source UE and the relay UE for the relay UE.

The relay UE receives the base station configuration and exchanges relay BH bearer configuration with the target UE through a PC5 RRC signaling. After receiving the base station configuration, UE1 forwards the PC5 RRC signaling and exchanges the end-to-end sidelink bearer configuration between the source UE and the target UE with UE3 through the relay UE.

It is to be noted that there is no timing limitation on step 8 and steps 5 to 7 in FIG. 15. Step 8 may be before step 5.

Figure 16:
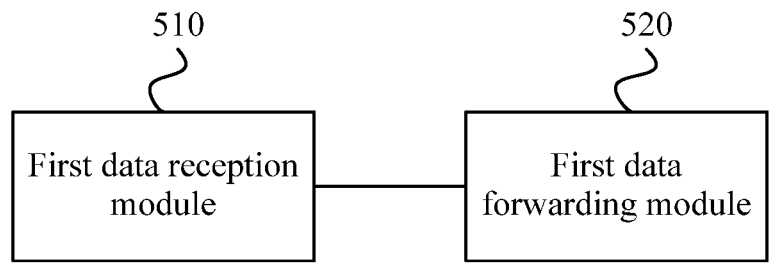
FIG. 16 is a structural diagram of a sidelink relay communication apparatus according to the present application.

An embodiment provides a sidelink relay communication apparatus. FIG. 16 is a structural diagram of a sidelink relay communication apparatus according to the present application. As shown in FIG. 16, the sidelink relay communication apparatus provided by this embodiment of the present application may be configured to a communication device applied to UE-to-Network relay communication. The apparatus includes a first data reception module 510 and a first data forwarding module 520.

The first data reception module 510 is configured in the relay UE and to receive a data packet from a source communication device through a first bearer between the source communication device and the relay UE, where the data packet is mapped to the first bearer by the source communication device.

The first data forwarding module 520 is configured in the relay UE and to map the data packet to a second bearer between the relay UE and a target communication device and transmits the data packet to the target communication device.

The source communication device includes a remote UE and the target communication device correspondingly includes a base station, or the source communication device includes a base station and the target communication device correspondingly includes a remote UE.

The sidelink relay communication apparatus applied to UE-to-Network relay communication provided by this embodiment is used for implementing the sidelink relay communication method applied to UE-to-Network relay communication as described in embodiments of the present application. The implementation principles and technical effects of the sidelink relay communication apparatus applied to UE-to-Network relay communication provided by this embodiment are similar to those of the sidelink relay communication method applied to UE-to-Network relay communication described in embodiments of the present application. The details are not repeated here.

In one example, the source communication device is the remote UE, and the target communication device is the base station.

The first data reception module 510 is specifically configured in the relay UE and to receive the data packet from the remote UE through the PC5 RLC bearer. The data packet is mapped from a Uu bearer to the PC5 RLC bearer between the remote UE and the relay UE by the remote UE based on a configured mapping relationship.

The first data forwarding module 520 is specifically configured in the relay UE and to identify the Uu bearer of the remote UE to which the data packet belongs, map the data packet to the relay bearer between the relay UE and the base station, and transmit the data packet to the base station.

In one example, a manner in which the remote UE maps from the Uu bearer to the PC5 RLC bearer between the remote UE and the relay UE includes at least one of the following: the remote UE maps Uu bearer data packets to PC5 RLC bearers in a one-to-one manner; or the remote UE maps and/or delivers a Uu bearer data packet to an adaptation layer to make the data packet processed by the adaptation layer and maps the data packet processed by the adaptation layer to a PC5 RLC bearer.

In one example, the remote UE mapping and/or delivering the Uu bearer data packet to the adaptation layer to make the data packet processed by the adaptation layer includes adding an adaptation layer packet header. The adaptation layer packet header includes at least one of the following: a Uu bearer identifier or index of the remote UE, a relay forwarding indication, a Uu bearer priority of the remote UE, a 5G QoS identifier (5QI), or a QoS flow identifier (QFI).

In one example, the first data forwarding module 520 is specifically configured in the relay UE and to identify the Uu bearer of the remote UE to which the data packet belongs based on either an one-to-one mapping relationship, acquired from the base station or from predefinition, between Uu bearers of the remote UE and PC5 RLC bearers, or a Uu bearer identifier or index of the remote UE contained in an adaptation layer packet header.

In one example, a manner in which the relay UE maps the data packet to the relay bearer between the relay UE and the base station and transmits the data packet to the base station includes at least one of the following: the relay UE maps the data packet to a Uu RLC bearer associated with a relay UE protocol data unit (PDU) session dedicated for data forwarding to transmit; or the relay UE maps the data packet to a relay Uu backhaul bearer dedicated for relay data forwarding to send.

In one example, the first data forwarding module 520 is specifically configured in the relay UE adaptation layer and to add a packet header to the data packet and map the data packet to the relay Uu BH bearer. The packet header includes at least one piece of the following information: a remote UE identifier, a remote UE Uu bearer identifier, a PC5 RLC bearer identifier, or a logical channel identifier associated with a PC5 RLC bearer.

In one example, a manner in which the data packet is mapped to the relay Uu BH bearer includes at least one of the following: the relay UE maps the data packet to the relay Uu BH bearer based on a mapping relationship, which is configured by the base station, or pre-configured, or pre-defined, between the PC5 RLC bearer and the relay Uu BH bearer; the relay UE maps the data packet to relay Uu BH bearers of the same logical channel priority based on the logical channel priority of a PC5 RLC bearer; the relay UE maps the data packet to relay Uu BH bearers of the same bearer or logical channel priority based on the Uu bearer priority of the remote UE contained in a received PC5 adaptation layer; or the relay UE maps the data packet to a relay Uu BH bearer based on the 5QI contained in a received PC5 adaptation layer packet header and a mapping relationship, which is configured by the base station or pre-configured, between a 5QI and a relay Uu BH bearer.

In one example, the source communication device is a base station, and the target communication device is a remote UE.

The first data reception module 510 is specifically configured in the relay UE and to receive the data packet from the base station through the relay bearer. The data packet is mapped by the base station from the Uu bearer of the remote UE to the relay bearer between the base station and the relay UE.

The first data forwarding module 520 is specifically configured in the relay UE and to map the data packet to the PC5 RLC bearer between the relay UE and the remote UE and send the data packet to the remote UE.

In one example, a manner in which the base station maps the Uu bearer of the remote UE to the relay bearer between the base station and the relay UE includes at least one of the following: the base station maps the Uu bearer data packet of the remote UE to a Uu RLC bearer associated with a relay UE PDU session dedicated for data forwarding; or the base station delivers the data packet of the Uu bearer of the remote UE to an adaptation layer to make the data packet processed by the adaptation layer, adds an adaptation layer packet header to the data packet, and maps the data packet to a relay Uu BH bearer dedicated for data forwarding. The adaptation layer packet header includes at least one of the following: a remote UE identifier, a Uu bearer identifier or index of the remote UE, a Uu bearer priority of the remote UE, a 5QI, a QoS flow identifier (QFI), or a PC5 RLC bearer identifier or logical channel identifier.

In one example, a manner in which the relay UE maps the data packet to the PC5 RLC bearer between the relay UE and the remote UE includes at least one of the following: if the PC5 RLC bearer is a bi-directional bearer, a reverse mapping is performed based on the mapping relationship between an uplink PC5 RLC bearer and a relay Uu BH bearer; the data packet is mapped to the PC5 RLC bearer based on a mapping relationship, which is configured by the base station, or pre-configured, or predefined, between a relay Uu BH bearer and the PC5 RLC bearer; the data packet is mapped to the PC5 RLC bearers of the same bearer or logical channel priority based on the bearer priority or logical channel priority of a relay Uu BH bearer; the relay UE maps the data packet to the PC5 RLC bearer based on the Uu bearer identifier, index or priority information of the remote UE in an adaptation layer packet header and a mapping relationship, which is configured by the base station, or pre-configured, or predefined, between the Uu bearer of the remote UE and the PC5 RLC bearer; the relay UE maps the data packet to the PC5 RLC bearer based on the 5QI or QFI in an adaptation layer packet header and a mapping relationship, which is configured by the base station, or pre-configured, or predefined, between a 5QI or a QFI and a PC5 RLC bearer priority; the relay UE maps the data packet to the PC5 RLC bearer based on the PC5 RLC bearer identifier or logical channel identifier in an adaptation layer packet header; or the relay UE delivers the parsed data packet of an Uu interface to a PC5 interface adaptation layer to make the data packet processed by the adaptation layer, and the data packet is added an adaptation layer packet header and mapped to the PC5 RLC bearer to transmit. The adaptation layer packet header includes at least one of the following: a Uu bearer identifier or index of the remote UE, the Uu bearer priority of the remote UE, a 5QI, or a QFI.

In one example, the remote UE identifier includes at least one of the following: a UE layer 2 identifier, part of a UE layer 2 identifier, a cell radio network temporary identifier (C-RNTI) or local identifier configured by the base station for the remote UE, or a local identifier configured by the relay UE for the remote UE.

Figure 17:
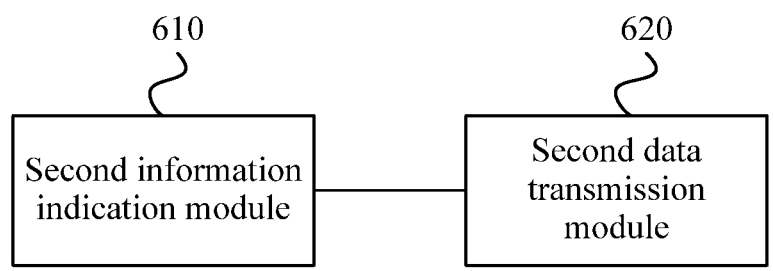
FIG. 17 is a structural diagram of a sidelink relay communication apparatus according to the present application.

An embodiment provides a sidelink relay communication apparatus. FIG. 17 is a structural diagram of a sidelink relay communication apparatus according to the present application. As shown in FIG. 17, the sidelink relay communication apparatus provided by this embodiment of the present application may be configured to a communication device applied to UE-to-Network relay communication. The apparatus includes a second information indication module 610 and a second data transmission module 620.

The second information indication module 610 is configured in the relay UE and to indicate relay communication auxiliary information to a base station.

The second data transmission module 620 is configured in the relay UE and to receive relay communication configuration information from the base station and perform data transmission based on the relay communication configuration information.

The sidelink relay communication apparatus applied to UE-to-Network relay communication provided by this embodiment is used for implementing the sidelink relay communication method applied to UE-to-Network relay communication as described in embodiments of the present application. The implementation principles and technical effects of the sidelink relay communication apparatus applied to UE-to-Network relay communication provided by this embodiment are similar to those of the sidelink relay communication method applied to UE-to-Network relay communication described in embodiments of the present application. The details are not repeated here.

In one example, the relay communication auxiliary information includes at least one of the following: relay communication indication information, a relay UE indication, a relay type, serving remote UE information, the communication RAT between the relay UE and the remote UE, or the PC5 communication RAT supported by the relay UE.

In one example, the relay communication configuration information includes at least one of the following: relay Uu backhaul bearer configuration, PC5 RLC bearer configuration, or the mapping relationship between a relay Uu BH bearer and a PC5 RLC bearer.

The relay Uu backhaul bearer configuration includes at least one of the following: a signaling forwarding bearer indication, a data forwarding bearer indication, a bearer identifier, an RLC mode, RLC configuration, a logical channel identifier, a logical channel priority, a logical channel group identifier, or logical channel related configuration.

The PC5 RLC bearer is divided into a bi-directional PC5 RLC bearer and a uni-directional PC5 RLC bearer. The uni-directional PC5 RLC bearer configuration includes related parameters sent or received by a sidelink bearer. The bi-directional PC5 RLC bearer configuration includes at least one of the following: an RLC acknowledged or unacknowledged mode or related configuration information of other RLC and a logical channel.

The mapping relationship between the relay Uu BH bearer and the PC5 RLC bearer includes at least one of the following: a bearer or logical channel identifier mapping or a bearer or logical channel priority mapping.

In one example, a configuration information forwarding module is further included. The configuration information forwarding module is configured in the relay UE and to forward remote communication configuration information configured by the base station for the remote UE.

The remote communication configuration information includes at least one of the following: Uu bearer configuration, PC5 RLC bearer configuration, or the mapping relationship between a Uu bearer and a PC5 RLC bearer.

The Uu bearer configuration includes at least one of the following: a bearer identifier, a mapping from a QFI or 5QI to a Uu bearer, whether to carry a service data adaptation protocol (SDAP) packet header, or PDCP configuration.

The PC5 RLC bearer is divided into a bi-directional PC5 RLC bearer and a uni-directional PC5 RLC bearer. The uni-directional PC5 RLC bearer configuration includes related parameters sent or received by a sidelink bearer. The bi-directional PC5 RLC bearer configuration includes at least one of the following: an RLC acknowledged or unacknowledged mode or related configuration information of other RLC and a logical channel.

The mapping relationship between the Uu bearer and the PC5 RLC bearer includes at least one of the following: a bearer or logical channel identifier mapping or a bearer or logical channel priority mapping.

In one example, after the relay UE indicates relay communication auxiliary information to the base station, the base station indicates or updates information of the relay UE and the remote UE to an access and mobility management function (AMF) entity. The information includes at least one of the following: a remote UE layer 2 identifier, a remote UE radio access network NG application protocol identifier (RAN NGAP ID), a relay UE layer 2 identifier, or a relay UE RAN NGAP ID.

In one example, a first communication RAT is used between the relay UE and the remote UE. A second communication RAT is used between the relay UE and the base station. After the remote UE establishes an RRC connection with the base station through the relay UE, the second communication RAT is used between the remote UE and the base station.

In one example, the first communication RAT is LTE. The second communication RAT is NR. The Uu bearer of the remote UE is an NR Uu bearer. The PC5 RLC bearer is an LTE PC5 RLC bearer. The relay Uu BH bearer is an NR Uu BH bearer.

In one example, the mapping relationship between a remote UE NR Uu bearer and an LTE PC5 RLC bearer includes at least one of the following: the mapping relationship between a 5QI or QFI and a near-field communication ProSe per-packet priority (PPPP), the mapping relationship between the priority in a 5QI and a PPPP, the mapping relationship between Uu bearer QoS and a PPPP, or the mapping relationship between a Uu bearer identifier or priority and a PPPP.

In one example, the bearer mapping relationship acquired by the relay UE includes at least one of the following: the mapping relationship between a relay Uu BH bearer or logical channel priority and a PPPP, the mapping relationship between the Uu bearer of the remote UE and a relay Uu BH bearer, the mapping relationship between a 5QI or a QFI and a relay Uu BH bearer, or the mapping relationship between the NR Uu bearer of the remote UE and an LTE PC5 RLC bearer.

In one example, the second communication RAT is LTE. The first communication RAT is NR. The Uu bearer of the remote UE is an LTE Uu bearer. The PC5 RLC bearer is an NR PC5 RLC bearer. The relay Uu BH bearer is an LTE Uu BH bearer.

In one example, the mapping relationship between a remote UE LTE Uu bearer and an NR PC5 RLC bearer includes at least one of the following: the mapping relationship between a QCI and a PQI, the mapping relationship between a Uu bearer identifier or priority or a QCI and the logical channel priority of a PC5 RLC bearer, or the mapping relationship between a Uu bearer identifier and the logical channel identifier of a PC5 RLC bearer.

In one example, the bearer mapping relationship acquired by the relay UE includes at least one of the following: the mapping relationship between a QCI and a PQI, the mapping relationship between a PC5 RLC bearer logical channel priority and a relay Uu BH bearer logical channel priority, the mapping relationship between a remote UE Uu bearer and a relay Uu BH bearer, the mapping relationship between a QCI and a PC5 RLC bearer logical channel priority, the mapping relationship between a PQI and a relay Uu BH bearer logical channel priority, or the mapping relationship between a remote UE LTE Uu bearer and an NR PC5 RLC bearer.

In one example, the mapping relationship is configured by a base station, or pre-configured, or configured by ProSe or a V2X control function, or configured by OAM, or defined by a protocol.

Figure 18:
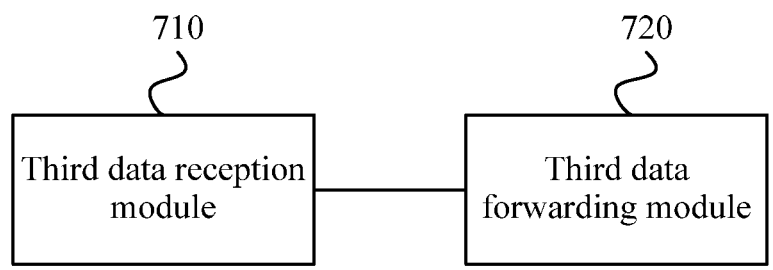
FIG. 18 is a structural diagram of a sidelink relay communication apparatus according to the present application.

An embodiment provides a sidelink relay communication apparatus. FIG. 18 is a structural diagram of a sidelink relay communication apparatus according to the present application. As shown in FIG. 18, the sidelink relay communication apparatus provided by this embodiment of the present application may be configured to a communication device applied to UE-to-UE relay communication. The apparatus includes a third data reception module 710 and a third data forwarding module 720.

The third data reception module 710 is configured in the relay UE and to receive a data packet from a source UE through a PC5 RLC bearer between the source UE and the relay UE. The data packet is mapped by the source UE to the PC5 RLC bearer and is.

The third data forwarding module 720 is configured in the relay UE and to parse the data packet, identify the target UE corresponding to the data packet, map the data packet to the relay backhaul bearer between the relay UE and the target UE, and send the data packet to the target UE.

The sidelink relay communication apparatus applied to UE-to-UE relay communication provided by this embodiment is used for implementing the sidelink relay communication method applied to UE-to-UE relay communication as described in embodiments of the present application. The implementation principles and technical effects of the sidelink relay communication apparatus applied to UE-to-UE relay communication provided by this embodiment are similar to those of the sidelink relay communication method applied to UE-to-UE relay communication described in embodiments of the present application. The details are not repeated here.

In one example, a source UE adaptation layer processing module is further included. The source UE adaptation layer processing module is configured in the source UE and to, before mapping the data packet to a PC5 RLC bearer, deliver the data packet to an adaptation layer to make the data packet processed by the adaptation layer. The adaptation layer processing includes adding an adaptation layer packet header. The adaptation layer packet header includes at least one of the following: a target UE identifier, a source UE identifier, a sidelink bearer identifier, a signaling bearer priority, or a PQI, a PFI, a 5QI, or a QFI.

In one example, the relay UE identifies the target UE corresponding to the data packet, including the relay UE identifying the sidelink bearer of the target UE corresponding to the data packet. A manner in which the relay UE identifies the sidelink bearer of the target UE corresponding to the data packet includes at least one of the following: identifying based on a sidelink bearer identifier in an adaptation layer packet header; identifying based on a mapping relationship, which is defined by the protocol, or configured by the base station or pre-configured, between a sidelink bearer and a PC5 RLC bearer or an LCID; or identifying through the source UE based on a PC5 RRC signaling informing the mapping relationship between the sidelink bearer of the relay UE and a PC5 RLC bearer or an LCD.

In one example, a manner in which the relay UE maps the data packet to the relay BH bearer between the relay UE and the target UE includes at least one of the following: the relay UE maps a forwarded data packet to the relay BH bearer based on a mapping relationship, which is defined by the protocol, or configured by the base station or pre-configured, between a PC5 RLC bearer and the relay BH bearer; the relay UE maps the data packet to the relay BH bearers of the same logical channel priority based on the logical channel priority of a PC5 RLC bearer; the relay UE maps the data packet to the relay BH bearers of the same bearer or logical channel priority based on the sidelink bearer identifier or signaling bearer priority contained in a received adaptation layer packet header; the relay UE maps the data packet to the relay BH bearer associated with the corresponding LCID based on the sidelink bearer identifier or bearer priority contained in a received adaptation layer packet header and a mapping relationship, which is defined by the protocol, or configured by the base station, or pre-configured, between a sidelink bearer or bearer priority and an LCID; or the relay UE maps the data packet to a relay BH bearer based on the 5QI, PQI, PFI, or QFI contained in a received adaptation layer packet header and a mapping relationship, which is configured by the base station or pre-configured, between a 5QI, PQI, PFI, or QFI and a relay BH bearer.

In one example, a relay UE adaptation layer processing module is further included. The relay UE adaptation layer processing module is configured in the relay UE and to, before mapping the data packet to the relay BH bearer between the relay UE and the target UE, process the data packet by an adaptation layer. The adaptation layer processing includes adding an adaptation layer packet header. The adaptation layer packet header includes at least one of the following: a source UE identifier, a target UE identifier, a sidelink bearer identifier, a PC5 RLC bearer identifier or a logical channel identifier associated with a PC5 RLC bearer identifier, or a sidelink bearer priority.

Figure 19:
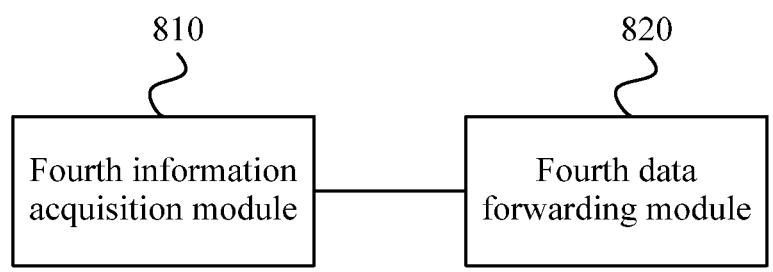
FIG. 19 is a structural diagram of a sidelink relay communication apparatus according to the present application.

An embodiment provides a sidelink relay communication apparatus. FIG. 19 is a structural diagram of a sidelink relay communication apparatus according to the present application. As shown in FIG. 19, the sidelink relay communication apparatus provided by this embodiment of the present application may be configured to a communication device applied to UE-to-UE relay communication. The apparatus includes a fourth information acquisition module 810 and a fourth data forwarding module 820.

The fourth information acquisition module 810 is configured in the relay UE and to acquire first configuration information of relay communication from a base station.

The fourth data forwarding module 820 is configured in the relay UE and to perform data forwarding for a source UE and a target UE according to the first configuration information of relay communication.

The sidelink relay communication apparatus applied to UE-to-UE relay communication provided by this embodiment is used for implementing the sidelink relay communication method applied to UE-to-UE relay communication as described in embodiments of the present application. The implementation principles and technical effects of the sidelink relay communication apparatus applied to UE-to-UE relay communication provided by this embodiment are similar to those of the sidelink relay communication method applied to UE-to-UE relay communication described in embodiments of the present application. The details are not repeated here.

In one example, a relay UE reporting module is further included. The relay UE reporting module is configured in the relay UE and to, before acquiring the first configuration information of relay communication, report forwarded service data related information to the base station. The forwarded service data related information includes at least one of the following: QoS information of service to be transmitted between the source UE and target UE3, end-to-end sidelink bearer configuration between the source UE and the target UE, or PC5 RLC bearer configuration between the source UE and the relay UE.

In one example, the first configuration information of relay communication includes at least one of the following: the relay BH bearer between the relay UE and the target UE, or the mapping relationship between the PC5 RLC bearer between the source UE and the relay UE and a relay BH bearer.

In one example, a source UE relay communication configuration module is included. The source UE relay communication configuration module is configured in the source UE and to acquire second configuration information of relay communication from the base station; and the source UE then communicates with the target UE through the relay UE according to the second configuration information of relay communication.

In one example, a source UE reporting module is included. The source UE reporting module is configured in the source UE and to, before acquiring the second configuration information of relay communication from the base station, report sidelink terminal information to the base station. The sidelink terminal information includes at least one of the following: a remote UE indication, a target UE identifier, QoS flow information corresponding to a target UE identifier, or a relay UE identifier.

In one example, the second configuration information of relay communication includes at least one of the following: end-to-end sidelink bearer configuration between the source UE and the target UE, PC5 RLC bearer configuration between the source UE and the relay UE, or the mapping relationship between the end-to-end sidelink bearer between the source UE and the target UE and the PC5 RLC bearer between the source UE and the relay UE.

The end-to-end sidelink bearer configuration between the source UE and the target UE includes any one of the following: a target UE identifier, a bearer identifier or index, a mapping from a QoS flow to a sidelink bearer, whether to carry an SDAP subheader, PDCP configuration, or the PC5 RLC bearer identifier or index between a source UE and a relay UE associated with the source UE.

In one example, a bearer configuration exchange module is further included. The bearer configuration exchange module is configured in the source UE and to, before communicating with the target UE through the relay UE according to the second configuration information of relay communication, exchange, through a PC5 RRC signaling, with the relay UE the PC5 RLC bearer configuration between the source UE and the relay UE, the QoS information of service to be transmitted between the source UE and target UE3, and the end-to-end sidelink bearer configuration between the source UE and the target UE; and/or exchange, through forwarding a PC5 RRC signaling by the relay UE, with the target UE the end-to-end sidelink bearer configuration between the source UE and the target UE.

Figure 20:
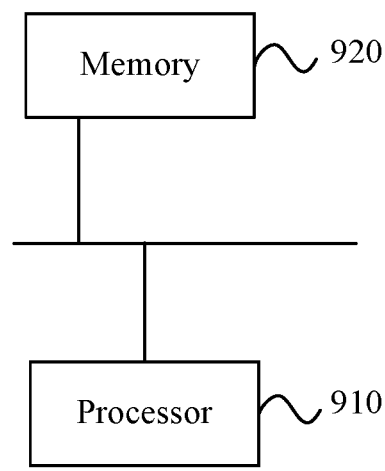
FIG. 20 is a structural diagram of a communication device according to the present application.

An embodiment of the present application provides a communication device. FIG. 20 is a structural diagram of a communication device according to the present application. As shown in FIG. 20, the communication device provided in the present application includes one or more processors 910 and a memory 920. One or more processors 910 may be provided in the communication device. In FIG. 20, one processor 910 is used as an example. The memory 920 is used for storing one or more programs. When executed by the one or more processors 910, the one or more programs cause the one or more processors 910 to implement the sidelink relay communication method applied to UE-to-Network relay communication or the sidelink relay communication method applied to UE-to-UE relay communication described in embodiments of the present application.

The one or more processors 910 in the communication device and the memory 920 in the communication device are connected through a bus or in other manners. The connection through a bus is taken as an example in FIG. 20.

The memory 920, as a computer-readable storage medium, may be configured to store a software program, a computer-executable program, and a module, such as a program instruction/module corresponding to the sidelink relay communication method applied to UE-to-Network relay communication as described in embodiments of the present application (for example, a first data reception module 510 and a first data forwarding module 520 in the sidelink relay communication apparatus applied to UE-to-Network relay communication, and for another example, a second information indication module 610 and a second data transmission module 620 in the sidelink relay communication apparatus applied to UE-to-Network relay communication) or a program instruction/module corresponding to the sidelink relay communication method applied to UE-to-UE relay communication (for example, a third data reception module 710 and a third data forwarding module 720 in the sidelink relay communication apparatus applied to UE-to-UE relay communication, and for another example, a fourth information acquisition module 810 and a fourth data forwarding module 820 in the sidelink relay communication apparatus applied to UE-to-UE relay communication). The memory 920 may include a program storage region and a data storage region. The program storage region may store an operating system and an application program required by at least one function. The data storage region may store data created depending on the use of the device. Additionally, the memory 920 may include a high-speed random-access memory and may also include a nonvolatile memory such as at least one disk memory, a flash memory or another nonvolatile solid-state memory. In some examples, the memory 920 may further include memories located remotely relative to the processors 910, and these remote memories may be connected to the communication node via a network. Examples of the preceding network include, but are not limited to, the Internet, an intranet, a local area network, a mobile communication network and a combination thereof.

An embodiment of the present application provides a storage medium storing a computer program which, when executed by a processor, implements the sidelink relay communication method applied to UE-to-Network relay communication or the sidelink relay communication method applied to UE-to-UE relay communication according to any embodiment of the present application.

A sidelink relay communication method applied to UE-to-Network relay communication includes a relay UE receiving a data packet which is mapped by a source communication device to a first bearer between the source communication device and the relay UE to send, where the source communication device includes a remote UE or a base station; and the relay UE mapping the data packet to a second bearer between the relay UE and a target communication device and transmitting the data packet to the target communication device, where the target communication device correspondingly includes a base station or a remote UE.

A sidelink relay communication method applied to UE-to-Network relay communication includes a relay UE indicating relay communication auxiliary information to a base station; and the relay UE receiving relay communication configuration information from the base station and performing data transmission based on the relay communication configuration information.

A sidelink relay communication method applied to UE-to-UE relay communication includes a relay UE receiving a data packet from a source UE through the PC5 RLC bearer between the source UE and the relay UE, where the data packet is mapped by the source UE to the PC5 RLC bearer; and the relay UE parsing the data packet, identifying the target UE corresponding to the data packet, mapping the data packet to the relay backhaul bearer between the relay UE and the target UE, and sending the data packet to the target UE.

A sidelink relay communication method applied to UE-to-UE relay communication includes a relay UE acquiring first configuration information of relay communication from a base station; and the relay UE performing data forwarding for a source UE and a target UE according to the first configuration information of relay communication.

The preceding are only example embodiments of the present application and are not intended to limit the scope of the present application.

It is to be understood by those skilled in the art that the term "user terminal" covers any suitable type of radio UE, for example, a mobile phone, a portable data processing apparatus, a portable web browser or a vehicle-mounted mobile station.

In general, multiple embodiments of the present application may be implemented in hardware, dedicated circuits, software, logic or any combination thereof. For example, some aspects may be implemented in hardware while other aspects may be implemented in firmware or software that may be executed by a controller, a microprocessor or another computing apparatus, though the present application is not limited thereto.

The embodiments of the present application may be implemented by computer program instructions executed by a data processor of an entity apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in the memory. The memory may be of any type suitable for a local technical environment and may be implemented using any suitable data storage technology, such as, but not limited to, a read-only memory (ROM), a random-access memory (RAM) and an optical memory device and system (digital video disc (DVD) or compact disc (CD)). The computer-readable medium may include a non-transitory storage medium. The data processor may be of any type suitable for the local technical environment, such as, but not limited to, a general-purpose computer, a special-purpose computer, a microprocessor, a digital signal processor (DSP), an application specific integrated circuit (ASIC), a field-programmable gate array (FPGA), and a processor based on a multi-core processor architecture.

What is claimed is:

1. A sidelink relay communication method, applied to a relay user equipment (UE), for UE-to-Network relay communication, comprising:
   receiving, by the relay UE, a data packet from a remote UE through a PC5 radio link control (RLC) bearer between the remote UE and the relay UE;
   identifying, by the relay UE, a Uu bearer of the remote UE associated with the data packet, according to a defined one-to-one mapping relationship between Uu bearers of the remote UE and PC5 RLC bearers;
   mapping, by the relay UE, the data packet to a relay Uu backhaul bearer, which is dedicated for relay forwarding, between the relay UE and a base station by adding a packet header to the data packet, wherein the packet header comprises a Uu bearer identifier of the remote UE; and
   transmitting, by the relay UE, the data packet to the base station.

2. The method according to claim 1, wherein the data packet is mapped, by the remote UE, from the Uu bearer of the remote UE to the PC5 RLC bearer between the remote UE and the relay UE by:
   delivering, by the remote UE, data packets on Uu bearers to an adaptation layer to make the data packets processed by the adaptation layer, and mapping the data packet processed by the adaptation layer to PC5 RLC bearers;
   wherein delivering, by the remote UE, the data packets on the Uu bearers to the adaptation layer to make the data packets processed by the adaptation layer comprises:
      adding an adaptation layer packet header to the data packets on the Uu bearers, wherein the adaptation layer packet header comprises the Uu bearer identifier.

3. The method according to claim 1, wherein adding the packet header to the data packet is performed by an adaptation layer of the relay UE, and
   wherein the packet header further comprises a remote UE identifier.

4. The method according to claim 3, wherein the remote UE identifier comprises a local identifier configured by the base station for the remote UE.

5. The method according to claim 3, wherein identifying, by the relay UE, the Uu bearer of the remote UE associated with the data packet comprises:
   identifying, by the relay UE, the Uu bearer of the remote UE according to the Uu bearer identifier of the remote UE contained in the packet header added by the adaptation layer of the relay UE.

6. The method according to claim 1, further comprising:
   indicating, by the relay UE, relay communication auxiliary information to the base station; and
   receiving, by the relay UE, relay communication configuration information from the base station and performing data transmission based on the relay communication configuration information.

7. The method according to claim 6, wherein the relay communication auxiliary information comprises at least one of the following:
   a relay UE indication or a serving remote UE information.

8. The method according to claim 6, wherein the relay communication configuration information comprises at least one of:
   a local identifier configured by the base station for the remote UE, or
   a bearer mapping relationship which comprises: a mapping relationship between the Uu bearer of the remote UE and the PC5 RLC bearer.

9. A non-transitory storage medium storing a computer program which, when executed by a processor, implements the method according to claim 1.

10. A relay user equipment (UE), comprising:
    one or more processors; and
    a memory configured to store one or more programs, wherein
    when executed by the one or more processors, the one or more programs cause the one or more processors to:
       receive a data packet from a remote UE through a PC5 radio link control (RLC) bearer between the remote UE and the relay UE;
       identify a Uu bearer of the remote UE associated with the data packet, according to a defined one-to-one mapping relationship between Uu bearers of the remote UE and PC5 RLC bearers;
       map the data packet to a relay Uu backhaul bearer, which is dedicated for relay data forwarding, between the relay UE and a base station by adding a packet header to the data packet, wherein the packet header comprises a Uu bearer identifier of the remote UE; and
       transmit the data packet to the base station.

11. The relay UE according to claim 10, wherein the data packet is mapped by the remote UE, from the Uu bearer of the remote UE to the PC5 RLC bearer between the remote UE and the relay UE by:
    delivering, by the remote UE, data packets on Uu bearers to an adaptation layer to make the data packets processed by the adaptation layer, and mapping the data packet processed by the adaptation layer to PC5 RLC bearers;
    wherein delivering, by the remote UE, the data packets on the Uu bearers to the adaptation layer to make the data packets processed by the adaptation layer comprises:
       adding an adaptation layer packet header to the data packets on the Uu bearers, wherein the adaptation layer packet header comprises the Uu bearer identifier.

12. The relay UE according to claim 10, wherein an adaptation layer of the relay UE adds the packet header to the data packet, and wherein the packet header further comprises a remote UE identifier.

13. The relay UE according to claim 12, wherein the remote UE identifier comprises a local identifier configured by the base station for the remote UE.

14. The relay UE according to claim 12, wherein the one or more processors are configured to identify the Uu bearer of the remote UE associated with the data packet by identifying the Uu bearer of the remote UE according to the Uu bearer identifier of the remote UE contained in the packet header added by the adaptation layer of the relay UE.

15. The relay UE according to claim 10, wherein the one or more processors are further configured to:
   indicate relay communication auxiliary information to the base station; and
   receive relay communication configuration information from the base station and perform data transmission based on the relay communication configuration information.

16. The relay UE according to claim 15, wherein the relay communication auxiliary information comprises at least one of a relay UE indication or a serving remote UE information.

17. The relay UE according to claim 15, wherein the relay communication configuration information comprises at least one of:
   a local identifier configured by the base station for the remote UE, or
   a bearer mapping relationship which comprises a mapping relationship between the Uu bearer of the remote UE and the PC5 RLC bearer.

* * * * *